United States Patent
Hinners et al.

(10) Patent No.: US 10,566,927 B2
(45) Date of Patent: Feb. 18, 2020

(54) METHOD AND SYSTEM FOR OPTIMIZING THE CONFIGURATION OF A SOLAR POWER SYSTEM

(71) Applicant: SunRun, Inc., San Francisco, CA (US)

(72) Inventors: Billy Hinners, San Rafael, CA (US); Gary Wayne, Berkeley, CA (US)

(73) Assignee: Sunrun, Inc., San Francisco, CA (US)

( * ) Notice: Subject to any disclaimer, the term of this patent is extended or adjusted under 35 U.S.C. 154(b) by 0 days.

(21) Appl. No.: 13/677,208

(22) Filed: Nov. 14, 2012

(65) Prior Publication Data

US 2014/0130840 A1    May 15, 2014

(51) Int. Cl.
*H02S 50/00* (2014.01)
*G06F 17/50* (2006.01)
*H02S 50/10* (2014.01)

(52) U.S. Cl.
CPC .......... *H02S 50/00* (2013.01); *G06F 17/5004* (2013.01); *G06F 17/5009* (2013.01); *H02S 50/10* (2014.12); *F24S 2201/00* (2018.05); *G06F 2217/02* (2013.01); *G06F 2217/08* (2013.01); *Y02B 10/12* (2013.01)

(58) Field of Classification Search
CPC .......... Y02E 10/50; Y02E 10/47; H02S 20/23; H02S 20/25; H02S 50/00; Y02B 10/12; Y02B 10/20; H01L 31/18; H01L 31/02008; H01L 31/05; H01L 31/042; G06F 17/5004; G06F 17/5009; G06F 2217/02; G06F 2217/08; F24J 2200/04

USPC ....... 136/243, 244, 252; 703/1; 705/28, 348, 705/400; 706/47, 54; 111/243, 244, 252; 11/243, 244, 252

See application file for complete search history.

(56) References Cited

U.S. PATENT DOCUMENTS

| | | |
|---|---|---|
| 6,546,535 B1 * | 4/2003 | Nagao et al. ................. 716/120 |
| 2006/0174930 A1 | 8/2006 | Murphy et al. |
| 2009/0234692 A1 | 9/2009 | Powell et al. |
| 2010/0217565 A1 | 8/2010 | Wayne et al. |
| 2010/0217566 A1 | 8/2010 | Wayne et al. |
| 2010/0217639 A1 | 8/2010 | Wayne et al. |
| 2010/0217724 A1 * | 8/2010 | Wayne et al. ................. 705/348 |
| 2011/0174294 A1 | 7/2011 | Adel et al. |

(Continued)

OTHER PUBLICATIONS

International Search Report and Written Opinion, PCT/US2013/065188, dated Mar. 13, 2014, 17 pages.

*Primary Examiner* — Mayla Gonzalez Ramos
(74) *Attorney, Agent, or Firm* — Kramer Levin Naftalis & Frankel LLP

(57) ABSTRACT

An optimization engine determines an optimal configuration for a solar power system projected onto a target surface. The optimization engine identifies an alignment axis that passes through a vertex of a boundary associated with the target surface and then constructs horizontal or vertical spans that represent contiguous areas where solar modules may be placed. The optimization engine populates each span with solar modules and aligns the solar modules within adjacent spans to one another. The optimization engine then generates a performance estimate for a collection of populated spans. By generating different spans with different solar module types and orientations, the optimization engine is configured to identify an optimal solar power system configuration.

20 Claims, 21 Drawing Sheets

(56) References Cited

U.S. PATENT DOCUMENTS

2012/0035887 A1* 2/2012 Augenbraun .......... G06T 15/06
703/1
2012/0167945 A1   7/2012 Shugar et al.
2012/0279558 A1  11/2012 West et al.
2013/0140416 A1   6/2013 West et al.

* cited by examiner

METHOD AND SYSTEM FOR OPTIMIZING THE CONFIGURATION OF A SOLAR POWER SYSTEM

BACKGROUND OF THE INVENTION

Field of the Invention

The present invention generally relates to solar power systems and more specifically to a method and system for optimizing the configuration of a solar power system.

Description of the Related Art

Solar power systems have provided a source of renewable energy for decades. A typical solar power system includes a set of solar panels that may be installed on a variety of target surfaces, such as, e.g., the roof of a residence. Prior to installation, a designer must configure the solar power system by determining the placement and the type of solar panels to be installed on the target surface. Once the configuration of the solar power system is determined, a set of solar panels may be physically mounted to the target surface according to that configuration.

One problem with the conventional installation process described above is that typical designers may have limited knowledge of solar power systems, and, thus, may not determine a configuration that results in optimal performance of the solar power system. This problem is compounded by the fact that solar power system performance is notoriously non-linear, and, thus, very sensitive to shading. Consequently, even small changes in solar panel shading from what is expected may cause the performance of the solar power system to decrease dramatically. Furthermore, configuring solar power systems manually is both time-consuming and expensive and can be difficult given that target surfaces are often space-constrained.

Accordingly, what is needed in the art is an improved technique for configuring a solar power system.

SUMMARY OF THE INVENTION

Embodiments of the invention include a method for determining a configuration of a solar power system projected onto a target surface, including constructing an alignment axis across the target surface, projecting a first span and a second span onto the target surface, where both the first span and the second span are parallel to the alignment axis, populating the first span with a first set of solar modules, populating the second span with a second set of solar modules, and aligning the second set of solar modules with the first set of solar modules to form a first solar module array.

Advantageously, an optimized configuration of solar modules for use within a solar power system to be installed on a given target surface can be programmatically identified, thereby greatly improving the potential performance of that solar power system. Furthermore, since the optimization engine is computer-implemented, the configuration process is significantly more expedient and less costly than traditional manually-performed techniques.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

The invention described herein comprises a system that automatically maximizes the size and/or configuration of a solar power system. In doing so, the system of the present invention determines a placement of solar modules that is consistent with optimal construction and engineering practices and is aesthetically pleasing.

Figure 1:
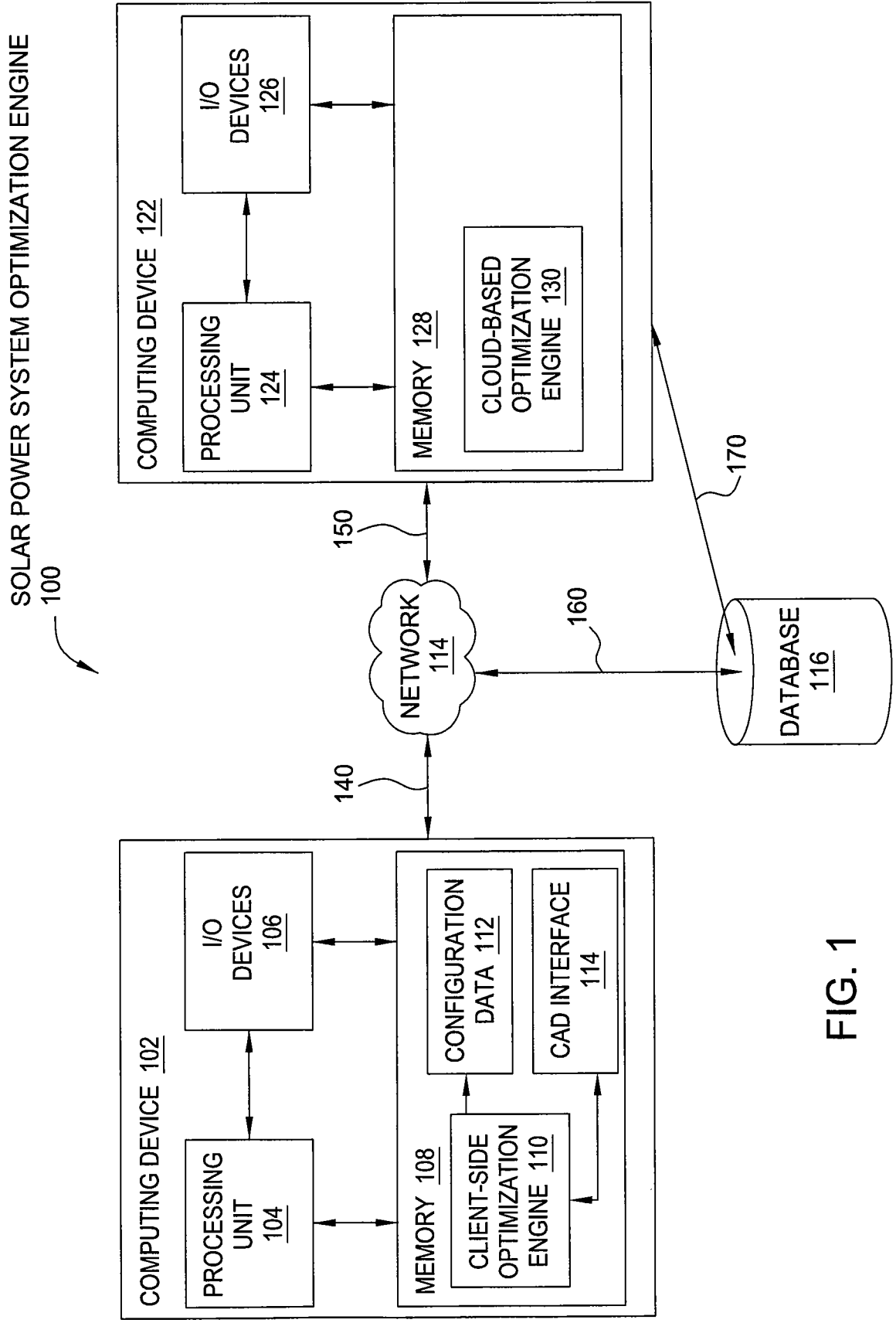
FIG. 1 is a block diagram illustrating a computer system configured to implement one or more aspects of the present invention.

FIG. 1 is a block diagram illustrating a solar power system optimization engine 100 configured to implement one or more aspects of the present invention. As shown, solar power system optimization engine 100, referred to hereinafter simply as "optimization engine 100," includes a computing device 102, a computing device 122, and a database 116 coupled together by a network 114. Network 114 could be any type of network, such as, e.g., the Internet or the World Wide Web.

Computing device 102 and computing device 122 are configured to exchange data across network 114 via communication paths 140 and 150. Computing device 102 may also read data from or write data to database 116 across network 114 via communication paths 140 and 160. Likewise, computing device 122 may read data from or write data to database 116 across network 114 via communication paths 150 and 160 or, alternatively, directly via communication path 170. Communication paths 140, 150, 160 and 170 may each be implemented as a wireless communication path, a wired communication path, or any other technically feasible type of communication path capable of transporting data.

As further described below and in conjunction with FIGS. 2-21, computing device 102 and computing device 122 are configured to cooperate to determine an optimized configuration for a solar power system. The optimized configuration includes a placement of one or more solar modules as well as a selection of one or more types of solar modules to be used. A solar module could be, for example, a photovoltaic (PV) solar panel.

An "optimized" configuration refers to any configuration that maximizes or minimizes a given performance metric. For example, the performance metric could be levelized cost of electricity (LCOE), and the optimized configuration would thus be the configuration with the lowest LCOE compared to other possible configurations. In another example, the performance metric could be estimated gross annual revenue, and the optimized configuration would thus be the configuration with the highest estimated gross annual revenue compared to other possible configurations. In another example, the performance could be the Net Present Value (NPV) of the system. Persons skilled in the art will understand that any reasonable performance metric could be used to identify the optimized solar power system configuration.

When determining the optimized solar power system configuration, computing devices 102 and/or 122 access database 116 in order to extract data that describes a target installation location for the solar power system, as described in greater detail below in conjunction with FIG. 2-3. Computing devices 102 and/or 122 then analyze the extracted data and determine the physical placement of various arrays of solar modules within the solar power system and the orientation of the solar modules within those arrays. Computing devices 102 and/or 122 also select one or more module types to be used within the arrays.

In one embodiment, computing device 102 operates as a client device and computing device 122 operates as a cloud-based device. In this embodiment, computing device 102 causes computing device 122 to perform the majority of the processing operations involved with determining the optimized configuration for the solar power system. Persons skilled in the art will recognize that computing device 102 and computing device 122 may distribute the processing tasks involved with determining the optimized configuration based on any technically feasible load-balancing algorithm. Those skilled in the art will also understand that either of computing devices 102 or 122 may perform all of the disclosed functionality of the present invention independently, i.e. without being coupled to another computing device, in a non-distributed manner. In such situations, the computing device performing the disclosed functionality may be a desktop computing device, laptop computing device, handheld computing device, and so forth.

Computing device 102 includes a processing unit 104 that is configured to perform various processing tasks and is coupled to input/output (I/O) devices 106 and to a memory 108. As shown, I/O devices 106 are also coupled to memory 108. Processing unit 104 may include one or more central processing unit (CPUs), parallel processing unit (PPUs), graphics processing unit (GPUs), application-specific integrated circuit (ASICs), field-programmable gate arrays (FPGAs), or any other type of processing unit capable of processing data. In addition, processing unit 104 may include various combinations of processing units, such as, e.g., a CPU coupled to a GPU. In on embodiment, computing device 102 is a mobile computing device, such as, e.g., a cell phone or tablet computing device.

I/O devices 106 may include input devices, such as a keyboard, a mouse, a touchpad, a microphone, a video camera, and so forth. I/O devices 106 may also include output devices, such as a screen, a speaker, a printer, and so forth. In addition, I/O devices 106 may include devices capable of performing both input and output operations, such as a touch screen, an Ethernet port, a universal serial bus (USB) port, a serial port, etc. I/O devices 106, as well as processing unit 104 described above, are both configured to read data from and write data to memory 108.

Memory 108 may include a hard disk, one or more random access memory (RAM) modules, a compact disc (CD) residing within a CD drive, a zip disk, and so forth. Persons skilled in the art will understand that memory 108 could be implemented as any technically feasible unit capable of storing data. Memory 108 includes a client-side optimization engine 110, configuration data 112, and a client-side computer-aided design (CAD) interface 114.

Client side optimization engine 110 is a software program that includes a set of program instructions capable of being executed by processing unit 104. When executed by processing unit 104, client-side optimization engine 110 configures processing unit 104 to participate in determining an optimized configuration for the solar power system to be installed on the target surface, as mentioned above. In doing so, client-side optimization engine 110 may cooperate with a corresponding software program within computing device 122, a cloud-based optimization engine 130, described below, in order to determine (i) the placement of solar modules on the target surface and (ii) a selection of solar module type to be used. Client-side optimization engine 110 cooperates with cloud-based optimization engine 130 in order to generate configuration data 112 that specifies the placement of the solar modules on the target surface and the selection of solar module type to be used.

Computing device 122 may be substantially similar to computing device 130 and includes a processing unit 124 that is configured to perform various processing tasks. Processing unit 122 is coupled to I/O devices 126 and to a memory 128. As shown, I/O devices 126 are also coupled to memory 128. Processing unit 124 may be substantially similar to processing unit 104 included within computing device 102, and, thus, may include one or more CPUs, PPUs, GPUs, ASICs, FPGAs, as well as various combinations of processing components, such as, e.g., a CPU coupled to a GPU.

I/O devices 126 may be substantially similar to I/O devices 106 included within computing device 102, and, thus, may include input devices, such as a keyboard, a mouse, a touchpad, a microphone, a video camera, and so forth, output devices, such as a screen, a speaker, a printer, and so forth, as well as devices capable of performing both input and output operations, such as a touch screen, an Ethernet port, a USB port, a serial port, etc. I/O devices 126, as well as processing unit 124 described above, are both configured to read data from and write data to memory 128.

Memory 128 may be substantially similar to memory 108 included within computing device 102, and, thus, may include a hard disk, one or more RAM modules, a CD residing within a CD drive, a zip disk, and so forth. Persons skilled in the art will understand that memory 128 could be implemented by any technically feasible unit capable of storing data. Memory 128 includes a cloud-based optimization engine 130.

Cloud-based optimization engine 130 is a software program that includes a set of program instructions capable of being executed by processing unit 124. When executed by processing unit 124, cloud-based optimization engine 130 configures processing unit 124 to cooperate with client-side optimization engine 110, described above, in determining the optimized configuration for the solar power system. In doing so, cloud-based optimization engine 130 and/or client-side optimization engine 110 are configured to extract data that describes the target installation location from database 116 and then process that data.

Database 116 may be a computer system executing a database program, such as, e.g. MySQL or postgreSQL, or may also be a cloud-based service configured to provide data based on requests transmitted by remote computer systems, such as, e.g. Google Earth®, Bing™ Maps, Pictometry® Online for geocoded RGB imagery, Digital Surface Models and Digital Elevation Models and Clean Power Research's Clean Power Estimator® for utility electricity tariffs and local, state and federal incentives. In one embodiment, database 116 is included within computing device 122 or computing device 102 or, alternatively, distributed between computing devices 102 and 122. Database 116 includes geospatial data that may describe target installation locations suitable for solar power systems to be installed. For example, database 116 could include a set of aerial or satellite photographs of three-dimensional (3D) structures, Digital Surface Models or Digital Elevation Models. Each of these could be used to identify land surfaces, structures suitable for solar power installations and to identify shading of those facilities. Database 116 may also include one or more 3D models representing 3D structures and obstructions, like trees, that might cast shadows on the solar array. In one embodiment, the 3D models are generated from a set of aerial or satellite photographs.

Client side optimization engine 110 and cloud-based optimization engine 130 are configured to extract the geospatial data from database 116 and to analyze a portion of that data corresponding to a particular physical location. The physical location could be represented by, e.g., a street address or geospatial positioning system (GPS) coordinates, among others. Based on that analysis, client side optimization engine 110 and cloud-based optimization engine 130 generate an optimized solar power system configuration, as described above. In practice, client side optimization engine 110 within computing device 102 and cloud-based optimization engine 130 within computing device 122 work in conjunction with one another when generating the optimized solar power system configuration. Accordingly, for the sake of simplicity, the remainder of this description will simply describe the optimization engine 100, which includes computing devices 102 and 122, as performing the various steps involved with generating the optimized solar power system configuration.

Figure 2:
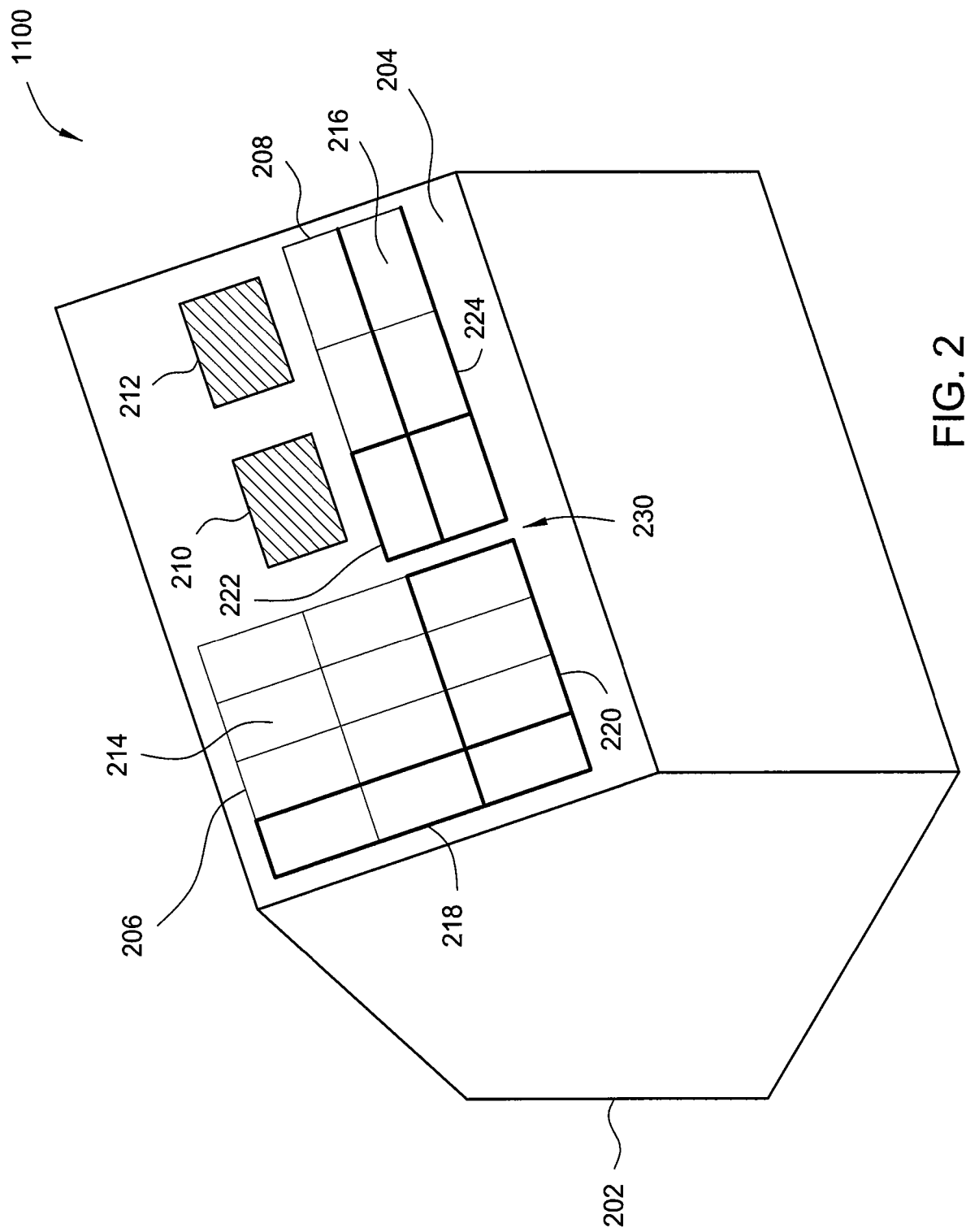
FIG. 2 is a conceptual diagram illustrating a solar power system installed on a three-dimensional (3D) structure, according to one embodiment of the present invention.

FIG. 2 is a conceptual diagram illustrating a solar power system 230 installed on a three-dimensional (3D) structure 202, according to one embodiment of the present invention. As shown, 3D structure 202 includes a surface 204, solar module arrays 206 and 208, and obstructions 210 and 212. Obstructions 210 and 212 could be any type of obstruction that would prevent the installation of a solar module, such as a skylight, a chimney, or a stovepipe, among others.

Each of solar module arrays 206 and 208 is comprised of one or more solar modules, such as, e.g. solar modules 214 or 216. As referred to herein, a "linear set" of solar modules is a collection of vertically- or horizontally-stacked solar modules. As shown, solar module array 206 includes linear sets 218 and 220. Linear set 218 includes vertically-stacked solar modules disposed according to a portrait orientation, while linear set 220 includes horizontally-stacked solar modules disposed according to a portrait orientation. As also shown, solar module array 208 includes linear sets 222 and 224. Linear set 222 includes vertically-stacked solar modules disposed according to a landscape orientation, while linear set 224 includes horizontally-stacked solar modules disposed according to a landscape orientation.

When generating an optimized solar power system configuration, optimization engine 100 performs an iterative procedure that involves generating a plurality of different linear sets having different orientations and including solar modules that have different orientations. In doing so, optimization engine 100 is configured to identify multiple different solar power system configurations.

A first step in the iterative procedure performed by optimization engine 100 involves stacking solar modules disposed according to a landscape orientation horizontally across the target surface similarly to linear set 224, as described in greater detail below in conjunction with FIGS. 5-7. A second step in the iterative procedure involves optimization engine 100 stacking solar modules disposed according to a portrait orientation horizontally across target surface similarly to linear set 220, as described in greater detail below in conjunction with FIGS. 8-10. A third step in the iterative procedure involves optimization engine 100 stacking solar modules disposed according to a portrait orientation vertically across the target surface similarly to linear set 218, as described in greater detail below in conjunction with FIGS. 12-14. A fourth step in the iterative procedure involves optimization engine 100 stacking solar modules disposed according to a landscape orientation vertically across the target surface similarly to linear set 222, as described in greater detail below in conjunction with FIGS. 15-17. In practice, optimization engine 100 may perform each of these steps serially or in parallel to determine different possible solar power system configurations.

Prior to performing the iterative procedure described above, optimization engine 100 first identifies the target surface onto which the solar modules are to be placed, as described in greater detail below in conjunction with FIG. 3.

Figure 3:
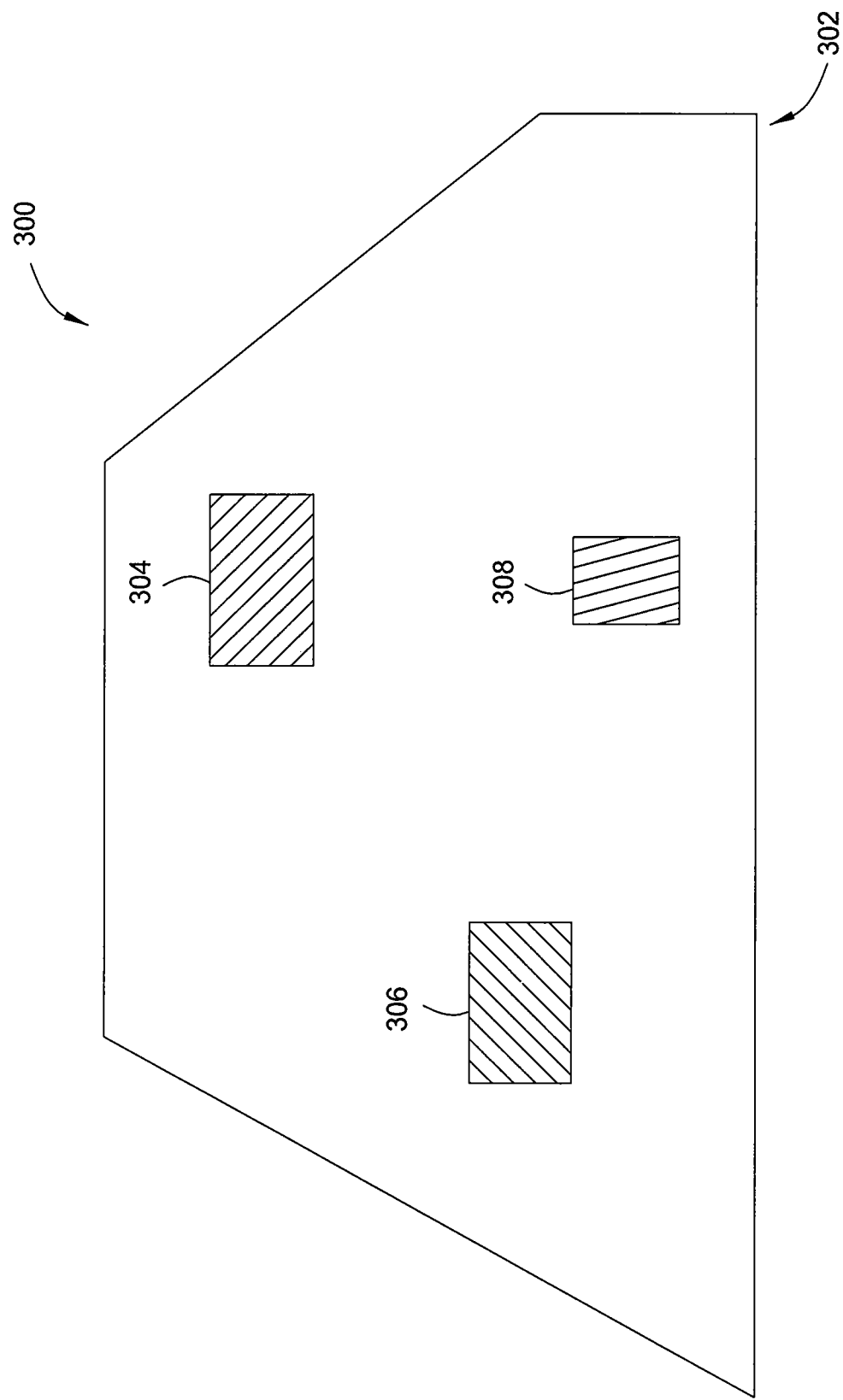
FIGS. 3-17 are conceptual diagrams each illustrating a different step in a process for determining an optimized solar power system configuration, according to one embodiment of the present invention.

FIG. 3 is a conceptual diagram 300 that includes a target surface 302. Target surface 302 could be, e.g., surface 204 shown in FIG. 2. Target surface 302 may represent a portion of the geospatial data describing the target installation location extracted from database 116 by optimization engine 100 or manually constructed through CAD interface 114. Target surface 302 could be a two-dimensional (2D) surface represented by a set of X-Y coordinates, a 3D surface represented by a set of X-Y-Z coordinates, or a set of vector equations that represent the various lines that make up target surface 302, among other representations. Persons skilled in the art will recognize that target surface 302 may be represented using any technically feasible data structure.

As shown, target surface 302 includes obstructions 304, 306, and 308. In general, obstructions 304, 306, and 308 represent regions unsuitable for the placement of solar modules. In one embodiment, optimization engine 100 identifies obstructions 304, 306, and 308 based on the geospatial data extracted from database 116. In another embodiment, the geospatial data includes indications of various obstructions generated via CAD interface 114 in conjunction with client-side optimization engine 110. Once target surface 302 has been identified from within the geospatial data extracted from database 116 or constructed by a user via CAD interface 114 in conjunction with client-side optimization engine 110, optimization engine 100 identifies one or more "alignment points" and one or more "alignment axes" that pass through those alignment points. When performing steps that involve horizontally-stacked solar modules, optimization engine 100 identifies alignment points and horizontal alignment axes in the fashion described below in conjunction with FIG. 4. When performing iterations that involve vertically-stacked solar modules, optimization engine 100 identifies alignment points and vertical alignment axes in the fashion described below in conjunction with FIG. 11.

Figure 4:
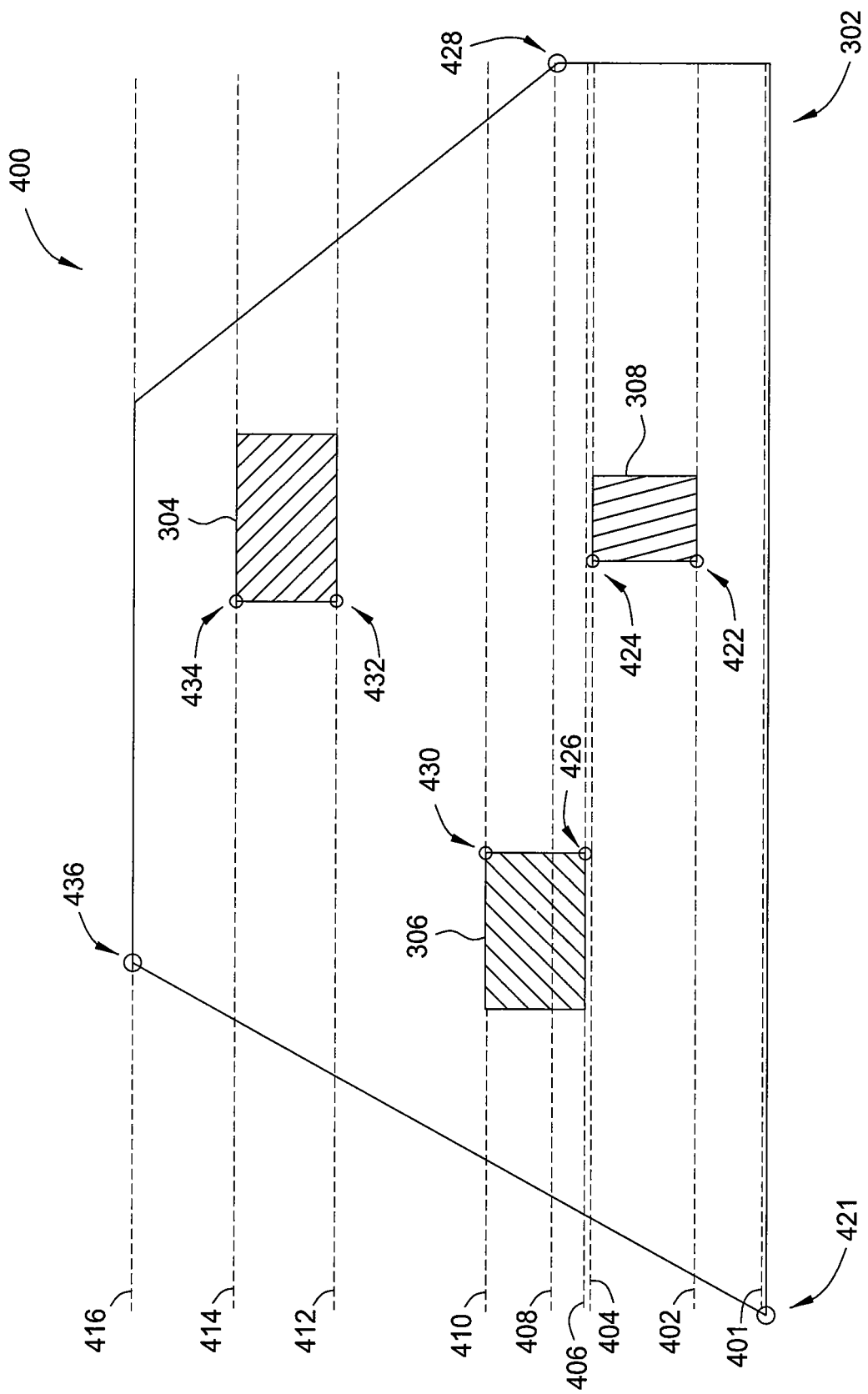

FIG. 4 is a conceptual diagram 400 that illustrates a set of alignment points and a set of horizontal alignment axes. As shown, conceptual diagram 400 includes target surface 302 and obstructions 304, 306, and 308 also shown in FIG. 3. In addition, conceptual diagram 400 also includes alignment axes 401, 402, 404, 406, 408, 410, 412, 414, and 416 that pass through alignment points 421, 422, 424, 426, 428, 430, 432, 434, and 436, respectively. Optimization engine 100 is configured to identify alignment points 421, 422, 424, 426, 428, 430, 432, 434, and 436 based on the geometry of target surface 302.

More specifically, optimization engine identifies vertices of obstructions associated with the target surface and/or vertices of a boundary of the target surface. For example, alignment points 422/424, 426/430, and 432/434 represent corners of obstructions 308, 306, and 304, respectively. Additionally, alignment points 421, 428, and 436 represent vertices of a boundary associated with target surface 302. Persons skilled in the art will recognize that additional alignment points may also be present on target surface 302. In practice, optimization engine 100 is configured to identify a set of alignment points that corresponds to a set of unique alignment axes. Once optimization engine 100 identifies the set of alignment axes, optimization engine 100 selects one such alignment axis. Based on the selected alignment axis, optimization engine 100 identifies spans of area that traverse portions of target surface 302 parallel to the selected alignment axis, as described in greater detail below in conjunction with FIG. 5. As also described below, the identified spans may then be populated with solar modules.

Figure 5:
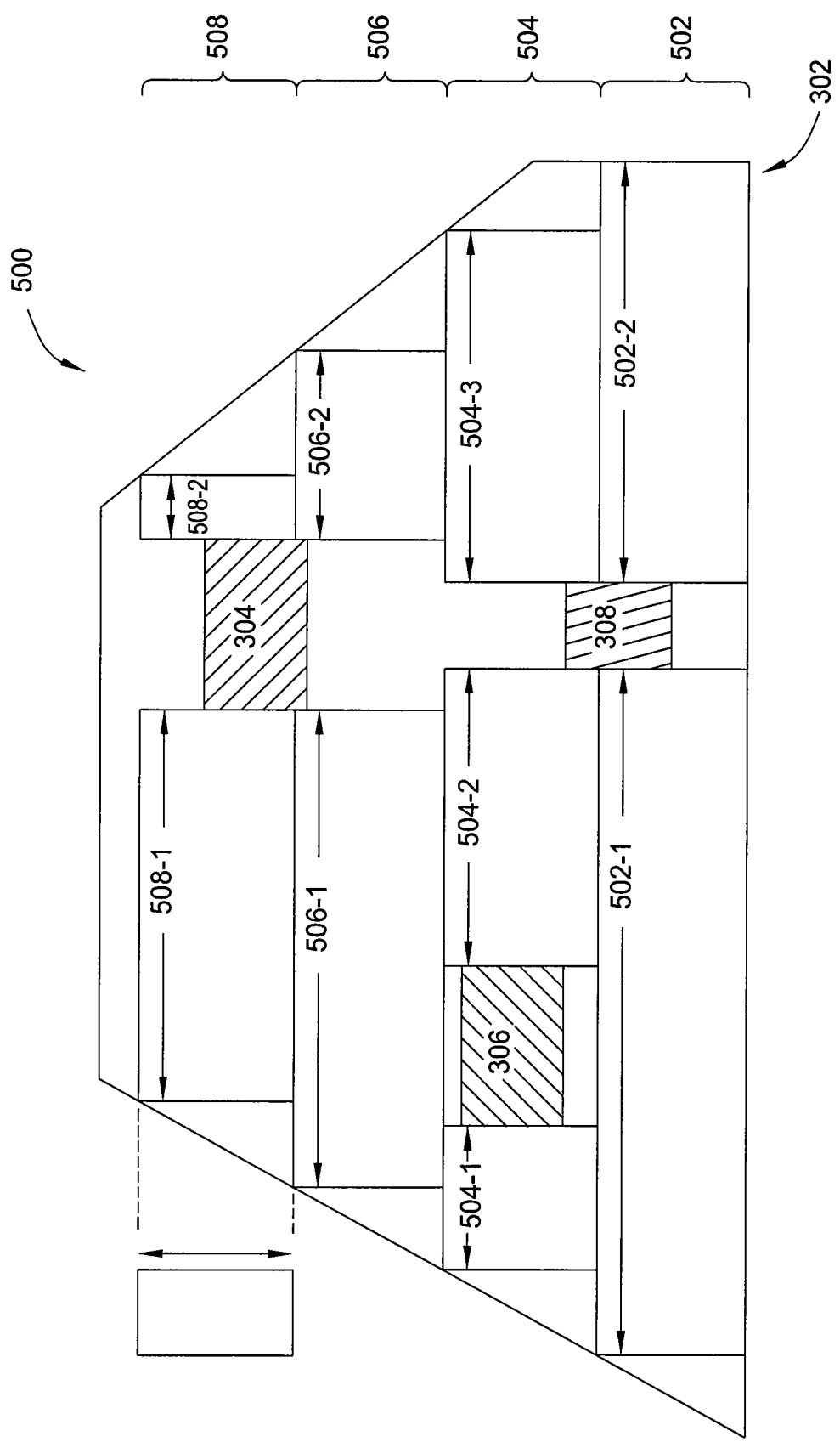

FIG. 5 is a conceptual diagram 500 that illustrates target surface 302 as well as rows 502, 504, 506 and 508. Row 502 includes span 502-1 and 502-2, row 504 includes spans 504-1, 504-2, and 504-3, row 506 includes spans 506-1 and 506-2, and row 508 includes span 508-1 and 508-2. Each row and the corresponding span(s) has a height equal to the height of a given solar module type disposed according to a portrait orientation. Optimization engine 100 is configured to identify each row shown in FIG. 5 and one or more corresponding spans relative to one of the alignment axes shown in FIG. 4. For exemplary purposes, FIG. 5 illustrates rows and corresponding spans generated by optimization engine 100 relative to alignment axis 401 (shown in FIG. 4).

For a given row, optimization engine 100 identifies one or more unobstructed spans that traverse target surface 302 parallel to the selected alignment axis. For example, optimization engine 100 identifies spans 502-1 and 502-2 residing within row 502. As is shown, obstruction 308 resides partially within row 502, and so optimization engine 100 identifies spans 502-1 and 502-2 to not be obstructed by obstruction 308. Persons skilled in the art will understand that optimization engine 100 identifies the unobstructed spans residing in rows 504, 506, and 508 in similar fashion. Upon identifying a set of spans associated with target surface 302, optimization engine 100 populates those spans with solar modules in order to create a collection of linear sets projected onto target surface 302, as described in greater detail below in conjunction with FIG. 6.

Figure 6:
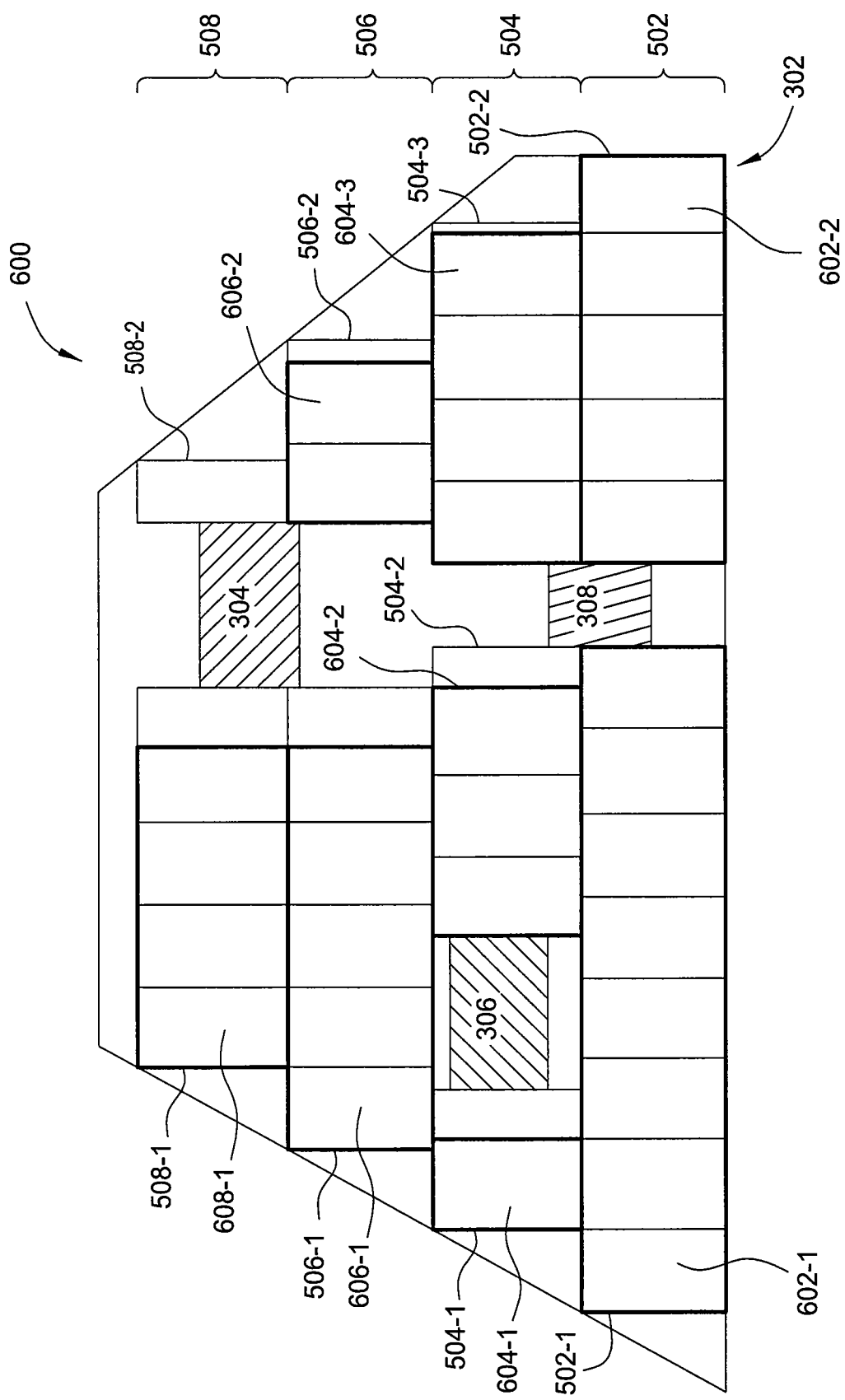

FIG. 6 is a conceptual diagram 600 that illustrates target surface 302 and a collection of linear sets projected onto target surface 302. Each linear set resides within a different span also projected onto target surface 302. As shown, span 502-1 includes linear set 602-1, span 502-2 includes linear set 602-2, span 504-1 includes linear set 604-1, span 504-2 includes linear set 604-2, span 504-3 includes linear set 604-3, span 506-1 includes linear set 606-1, span 506-2 includes linear set 606-2, and span 508-1 includes linear set 608-1. Span 508-2 does not include a linear set because that span lacks sufficient area for any solar modules.

Optimization engine 100 is configured to populate each span with horizontally-stacked solar modules disposed according to a portrait orientation in order to generate the linear sets shown in FIG. 6. Optimization engine 100 may align each linear set with the left side of the corresponding span or the right side of the corresponding span, among other initial alignments. In the exemplary embodiment shown in FIG. 6, each linear set is aligned to the left side of the corresponding span. Optimization engine 100 may re-align each linear set to an adjacent linear set, as described in greater detail below in conjunction with FIG. 7.

Figure 7:
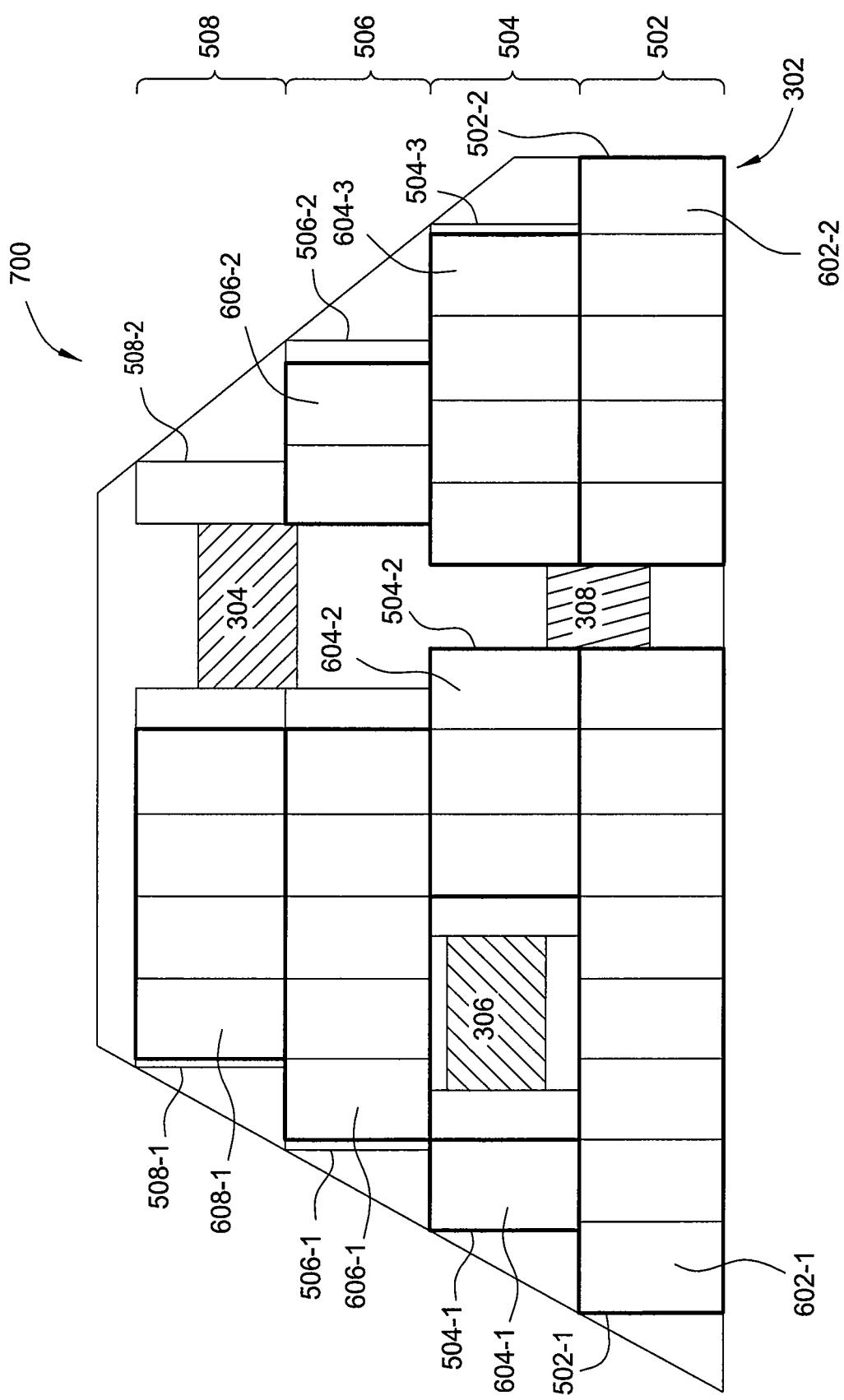

FIG. 7 is a conceptual diagram 700 that illustrates target surface 302 and the collection of linear sets projected onto target surface 302 described above in conjunction with FIG. 6. As shown, some of the linear sets shown have been re-aligned, i.e. the solar modules within certain linear sets have been shifted horizontally to have a vertical side collinear with a vertical side of a solar module within a vertically-adjacent linear set. Optimization engine 100 is configured to re-align some or all of the linear sets projected onto target surface 302 relative to a vertically-adjacent linear set.

In one embodiment, optimization engine 100 identifies one or more solar module arrays that each comprises one or more contiguous linear sets. For example, optimization engine 100 could identify linear sets 602-1, 604-1, 604-2, 606-1, and 608-1 as belonging to a first array, and linear sets 602-2, 604-3, and 606-2 as belonging to a second array. Optimization engine may then perform a sequential alignment process with the linear sets included in a given array. One such alignment process involves designating an "alignment set" that includes a maximum number of solar modules compared to other linear sets in the array. Optimization engine 100 then aligns each linear set in the array sequentially, starting with the alignment set and traversing the entire array.

In the exemplary embodiment shown in FIG. 7, optimization engine 100 designates linear set 602-1 as the alignment set and aligns linear sets 604-1 and 604-2 to linear set 602-1. For the subsequent alignment, optimization engine 100 designates linear set 604-2 as a "reference set" and aligns linear set 606-1 to linear set 604-2. Optimization engine 100 then designates linear set 606-1 as the reference set, and aligns linear set 608-1 to linear set 606-1. Through this sequential process, optimization engine 100 repeatedly designates an aligned set as a "reference set" and then aligns any adjacent linear sets thereto.

When aligning the linear sets included in the second array, optimization engine 100 designates linear set 602-2 as the alignment set and aligns linear set 604-3 to linear set 602-2. Optimization engine 100 then designates linear set 604-3 as the reference set, and determines that linear set 606-2 cannot be aligned to linear set 604-3. In this situation, optimization engine 100 refrains from shifting the solar modules within linear set 606-2. In general, when optimization engine 100 aligns linear sets within a given array, optimization engine 100 identifies one or more sequences of linear sets on which to perform the alignment process.

Although the above description makes reference to the exemplary embodiments shown in FIGS. 5-7, those skilled in the art will understand that those embodiments merely illustrate one example of optimization engine 100 performing a first in the iterative procedure discussed above in conjunction with FIG. 2. As mentioned above, optimization engine 100 may also perform a second step that involves stacking solar modules disposed according to a portrait orientation horizontally across target surface similarly to linear set 220 shown in FIG. 2, as discussed in greater detail below in conjunction with FIGS. 8-10.

Figure 8:
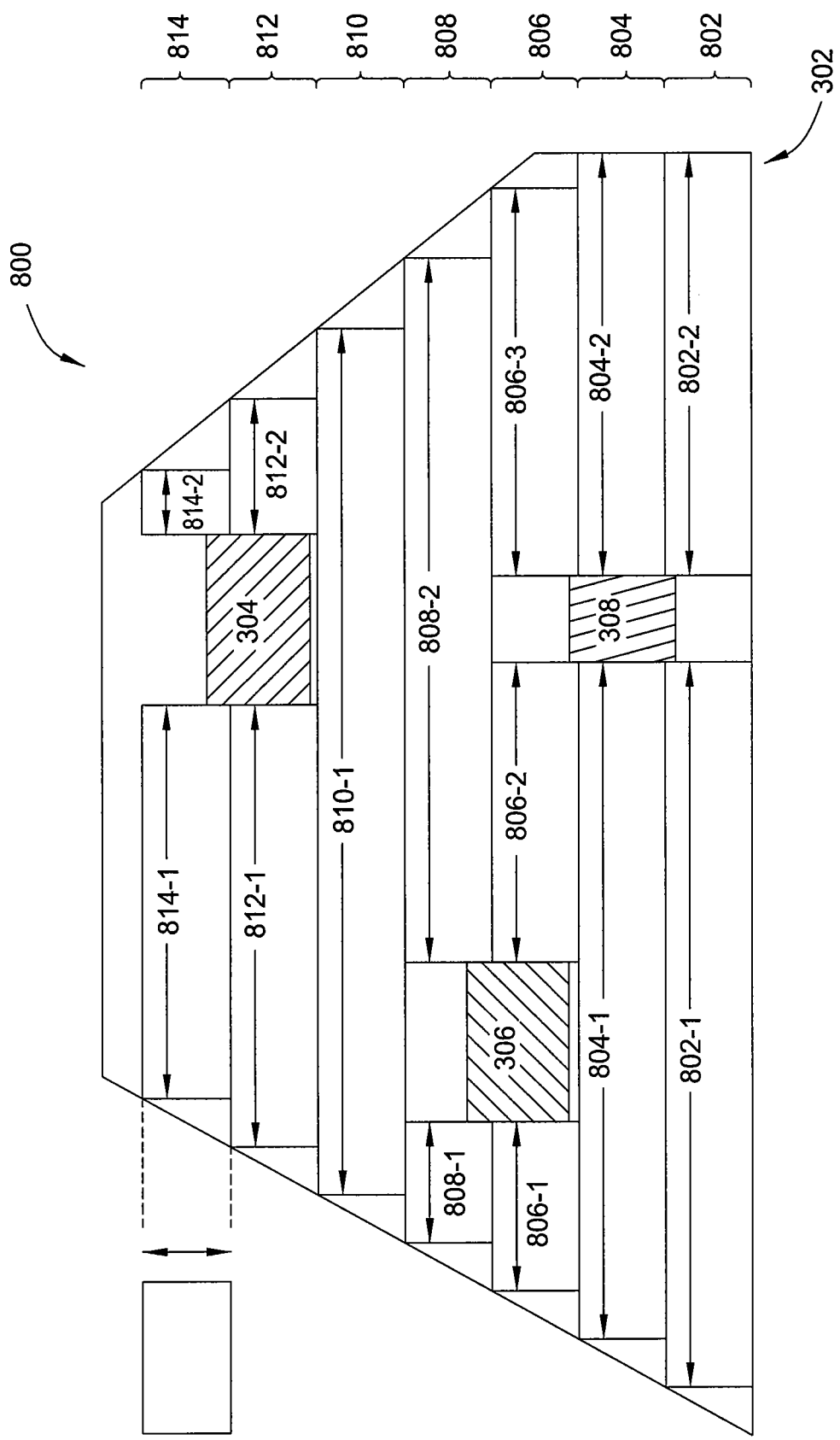

FIG. 8 is a conceptual diagram 800 that illustrates target surface 302 as well as rows 802, 804, 806, 808, 810, 812, and 814. Row 802 includes spans 802-1 and 802-2, row 804 includes spans 804-1 and 804-2, row 806 includes spans 806-1, 806-2, and 806-3, row 808 includes spans 808-1 and 808-2, row 810 includes span 810-1, row 812 includes spans 812-1 and 812-2, and row 814 includes spans 814-1 and 814-2. Each row and the corresponding span(s) has a height equal to the height of a given solar module type disposed according to a landscape orientation. Optimization engine 100 is configured to identify each row shown in FIG. 8 and one or more corresponding spans relative to one of the alignment axes shown in FIG. 4. For exemplary purposes, FIG. 8 illustrates rows and corresponding spans generated by optimization engine 100 relative to alignment axis 401 (shown in FIG. 4).

For a given row, optimization engine 100 identifies one or more unobstructed spans that traverse target surface 302 parallel to the selected alignment axis, in similar fashion as described above in conjunction with FIG. 5. For example, optimization engine 100 identifies spans 802-1 and 802-2 residing within row 802. As is shown, obstruction 308 resides partially within row 802, and so optimization engine 100 identifies spans 802-1 and 802-2 to not be obstructed by obstruction 308. Persons skilled in the art will understand that optimization engine 100 identifies the unobstructed spans residing in rows 804, 806, 808, 810, 812, and 814 in similar fashion. Upon identifying a set of spans associated with target surface 302, optimization engine 302 populates those spans with solar modules in order to create a collection of linear sets projected onto target surface 302, as described in greater detail below in conjunction with FIG. 9.

Figure 9:
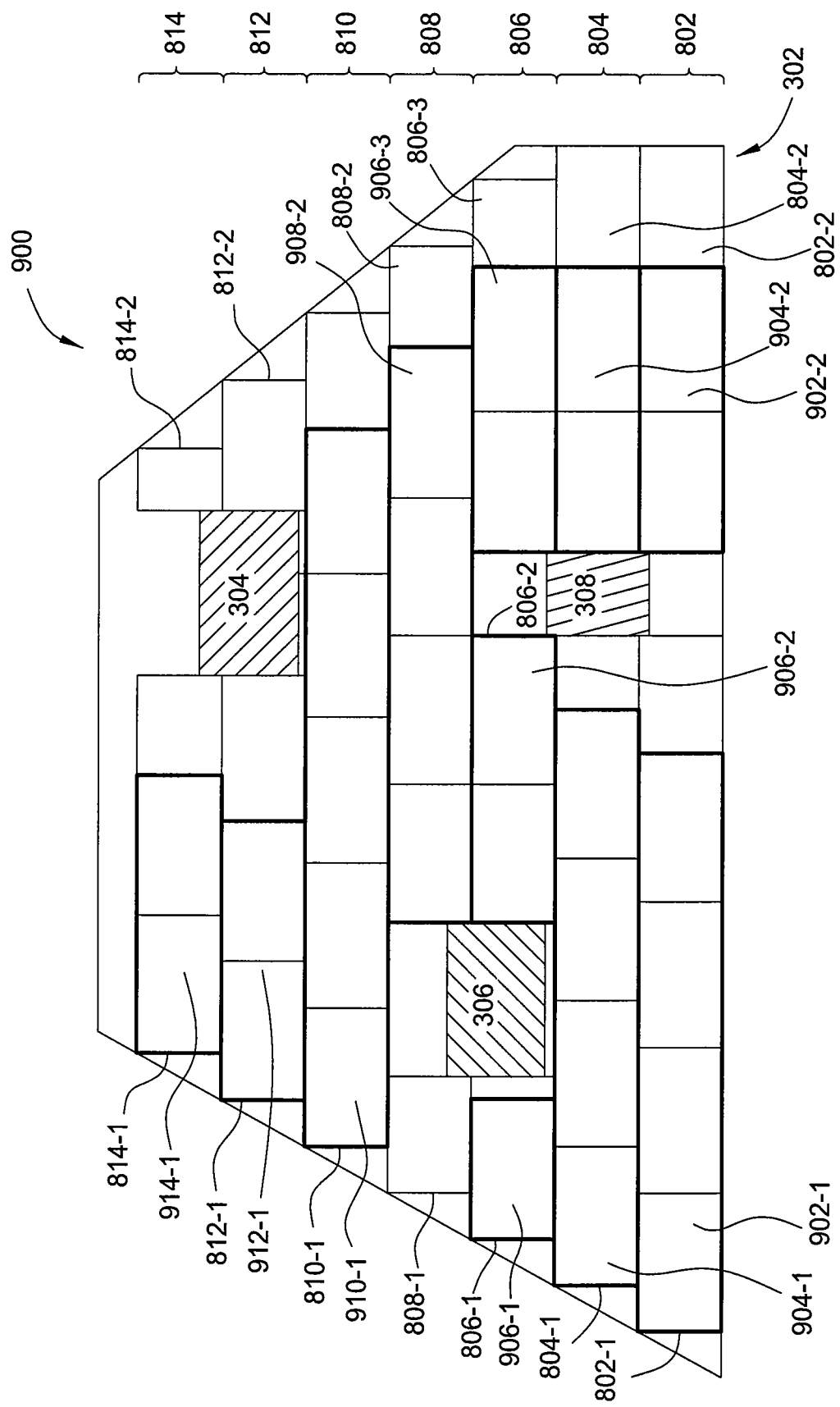

FIG. 9 is a conceptual diagram 900 that illustrates target surface 302 and a collection of linear sets projected onto target surface 302. Each linear set resides within a different span also projected onto target surface 302. As shown, span 802-1 includes linear set 902-1, span 802-2 includes linear set 902-2, span 804-1 includes linear set 904-1, span 804-2 includes linear set 904-2, span 806-1 includes linear set 906-1, span 806-2 includes linear set 906-2, span 806-3 includes linear set 906-3, span 808-2 includes linear set 908-2, span 810-1 includes linear set 910-1, span 812-1 includes linear set 912-1, and span 814-1 includes linear set 914-1. Each of spans 808-1, 812-1, and 814-1 do not include a linear set because those spans lack sufficient area for any solar modules.

Optimization engine 100 is configured to populate each span with horizontally-stacked solar modules disposed according to a landscape orientation in order to generate the linear sets shown in FIG. 9, in like fashion as described above in conjunction with FIG. 6. Optimization engine 100 may align each linear set with the left side of the corresponding span or the right side of the corresponding span, among other initial alignments. In the exemplary embodiment shown in FIG. 9, each linear set is aligned to the left side of the corresponding span. Optimization engine 100 is configured to re-align each linear set to an adjacent linear set, as described in greater detail below in conjunction with FIG. 10.

Figure 10:
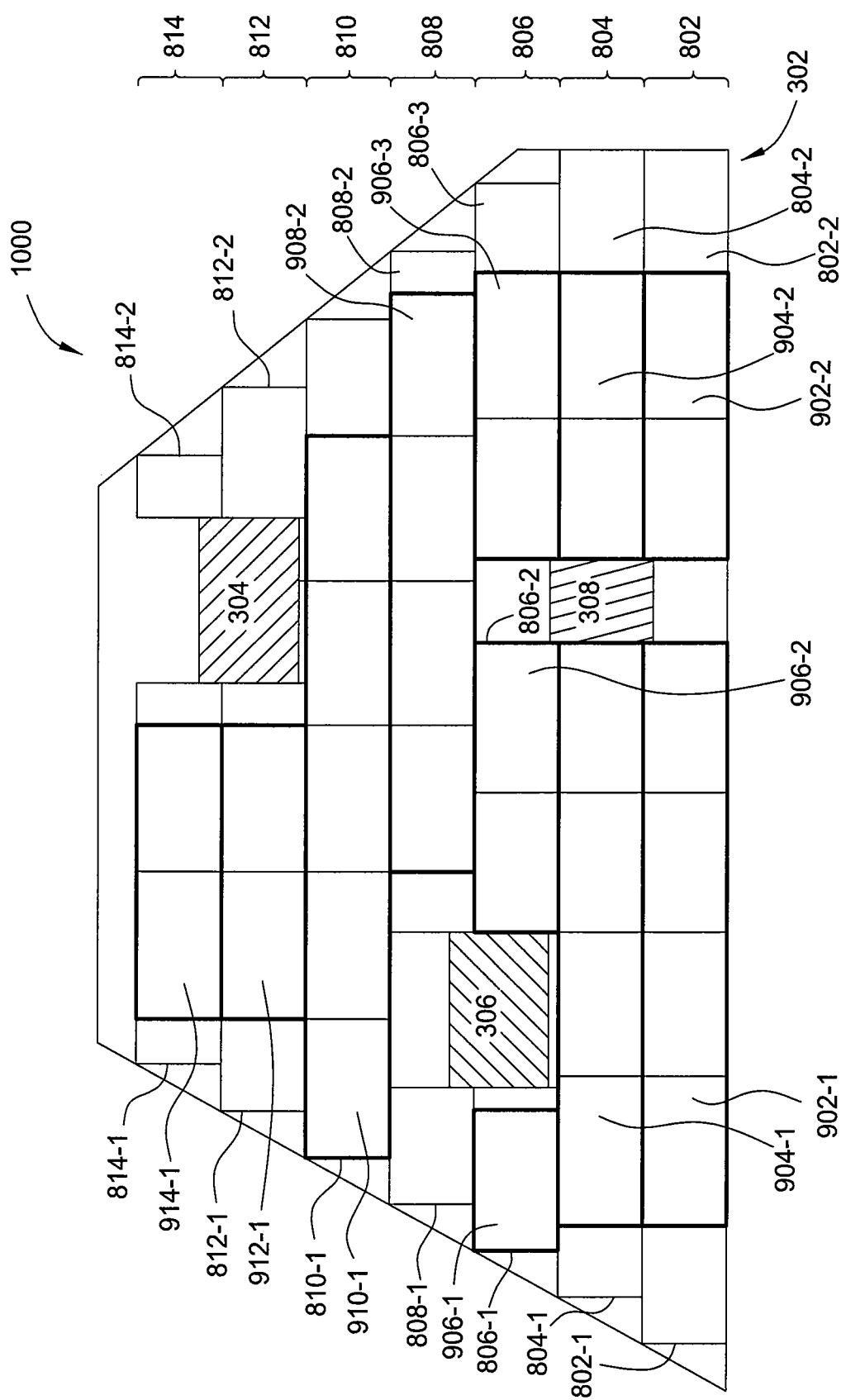

FIG. 10 is a conceptual diagram 1000 that illustrates target surface 302 and the collection of linear sets projected onto target surface 302 described above in conjunction with FIG. 9. As shown, some of the linear sets shown have been re-aligned. Optimization engine 100 is configured to re-align some or all of the linear sets projected onto target surface 302 relative to an adjacent linear set, in similar fashion as described above in conjunction with FIG. 7.

In the embodiment shown in FIG. 10, optimization engine 100 identifies just one solar module array, and selects linear set 910-1 as the alignment set for that array. Since the alignment set resides near the center of the array, optimization engine 100 may perform more than one separate alignment processes starting at the alignment set and traversing towards either the top or the bottom of the array. In doing so, optimization engine 100 may identify more than one sequence of linear sets on which to perform the alignment process. For example, optimization engine 100 could identify a first sequence that includes linear sets 912-1 and 914-1, a second sequence that includes linear sets 908-2, 906-3, 904-2, and 902-2, and a third sequence that includes linear sets 906-2, 904-1, 902-1, and 906-1.

When aligning solar modules residing within linear sets associated with the first sequence, optimization engine 100 first aligns linear set 912-1 to linear set 910-1 (the alignment set). Optimization engine 100 then designates linear set 912-1 as the reference set and aligns linear set 914-1 to linear set 912-1.

When aligning linear sets associated with the second sequence, optimization engine 100 aligns linear set 908-2 to linear set 910-1, and then designates linear set 908-2 as the reference set. Optimization engine 100 then determines that linear set 906-3 cannot be aligned to the current reference set, and so optimization engine 100 refrains from shifting the solar modules within linear set 906-3. Optimization engine 100 then designates linear set 906-3 as the reference set, and continues with the alignment process in like fashion as described above. In doing so, optimization engine 100 aligns linear set 904-2 to linear set 906-3, and aligns linear set 902-2 to linear set 904-2.

When aligning solar modules within linear sets associated with the third sequence, optimization engine 100 cannot align linear set 906-2 to linear set 908-2, and, thus, refrains from shifting the solar modules within linear set 906-2. Optimization engine 100 then designates linear set 906-2 as the reference set, aligns linear set 904-1 to linear set 906-2, designates linear set 904-1 as the reference set, and aligns linear set 902-1 to linear set 904-1. Since linear set 906-1 cannot be aligned to linear set 904-1, optimization engine 100 refrains from shifting the solar module within linear set 906-1.

In practice, optimization engine 100 may perform the alignment process row by row, i.e. by aligning the linear sets in each row relative to the alignment set or relative to a current reference set. By performing the sequential alignment process described above, optimization engine 100 may align the solar modules residing within each linear set with the solar modules residing in adjacent linear sets.

Although the above description makes reference to the exemplary embodiments shown in FIGS. 5-10, those skilled in the art will understand that those embodiments merely illustrate various examples of optimization engine 100 performing first and second steps in the iterative procedure that involve horizontally-stacked solar modules disposed according to either a portrait or landscape orientation. As mentioned above, optimization engine 100 may also perform a third and fourth steps in the iterative procedure that involve vertically-stacked solar modules, as discussed in greater detail below in conjunction with FIGS. 11-17.

Figure 11:
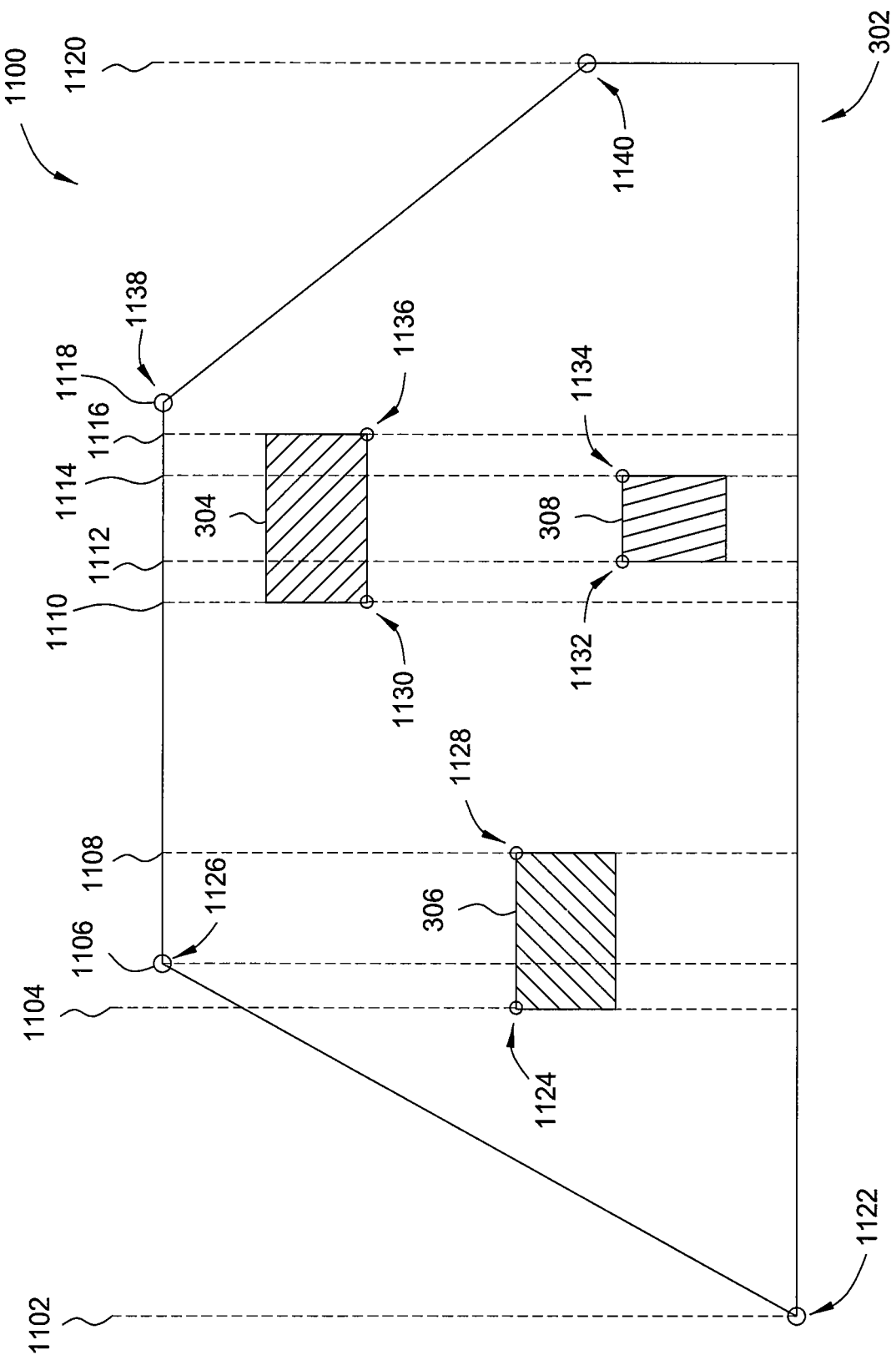

FIG. 11 is a conceptual diagram 1100 that illustrates a set of alignment points and a set of alignment axes. As shown, conceptual diagram 1100 includes target surface 302 and obstructions 304, 306, and 308, as well as vertical alignment axes 1102, 1104, 1106, 1108, 1110, 1112, 1114, 1116, 1118, and 1120 that pass through alignment points 1122, 1124, 1126, 1128, 1130, 1132, 1134, 1136, 1138, and 1140, respectively. Optimization engine 100 is configured to identify alignment points 1122, 1124, 1126, 1128, 1130, 1132, 1134, 1136, 1138, and 1140 based on the geometry of target surface 302, in like fashion as described above in conjunction with FIG. 4.

Once optimization engine 100 identifies the set of alignment axes, optimization engine 100 selects one such alignment axis. Based on the selected alignment axis, optimization engine 100 then identifies spans of area that traverse portions of target surface 302 parallel to the selected alignment axis. Optimization engine 100 may populate those spans with vertically-stacked solar modules disposed according to a portrait orientation when performing the third step in the iterative procedure, as described in greater detail below in conjunction with FIGS. 12-14. Optimization engine 100 may also populate those spans with vertically-stacked solar modules disposed according to a landscape orientation when performing the fourth step in the iterative procedure, as described in greater detail below in conjunction with FIGS. 15-17.

Figure 12:
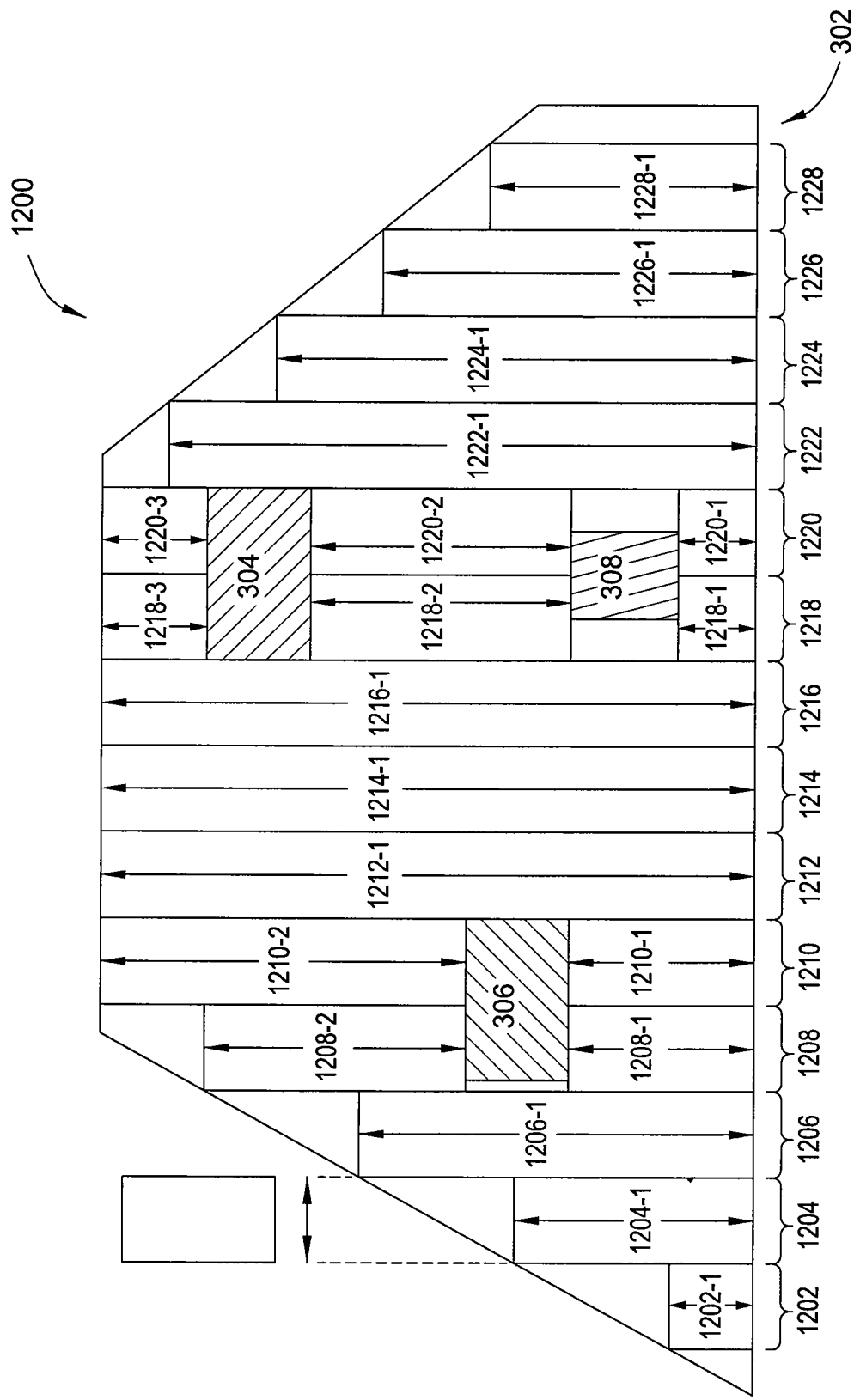

FIG. 12 is a conceptual diagram 1200 that illustrates target surface 302 as well as columns 1202, 1204, 1206, 1208, 1210, 1214, 1216, 1218, 1220, 1222, 1224, 1226, and 1228. Column 1202 includes span 1202-1, column 1204 includes span 1204-1, column 1206 includes span 1206-1, column 1208 includes spans 1208-1 and 1208-2, column 1210 includes spans 1210-1 and 1210-2, column 1212 includes span 1212-1, column 1214 includes span 1214-1, column 1216 includes span 1216-1, column 12-18 includes spans 1218-1, 1218-2, and 12-18-3, column 1220 includes spans 1220-1, 1220-2, and 1220-3, column 1222 includes span 1222-1, column 1224 includes span 1224-1, column 1226 includes span 1226-1, and column 1228 includes span 1228-1. Each column and the corresponding span(s) has a width equal to the width of a given solar module type disposed according to a portrait orientation. Optimization engine 100 is configured to identify each column shown in FIG. 12 and one or more corresponding spans relative to one of the alignment axes shown in FIG. 12. For exemplary purposes, FIG. 12 illustrates columns and corresponding spans generated by optimization engine 100 relative to alignment axis 1102 (shown in FIG. 11). Upon identifying the spans shown in FIG. 12, optimization engine may populate those spans with solar modules to generate a collection of linear sets, as described in greater detail below in conjunction with FIG. 13.

Figure 13:
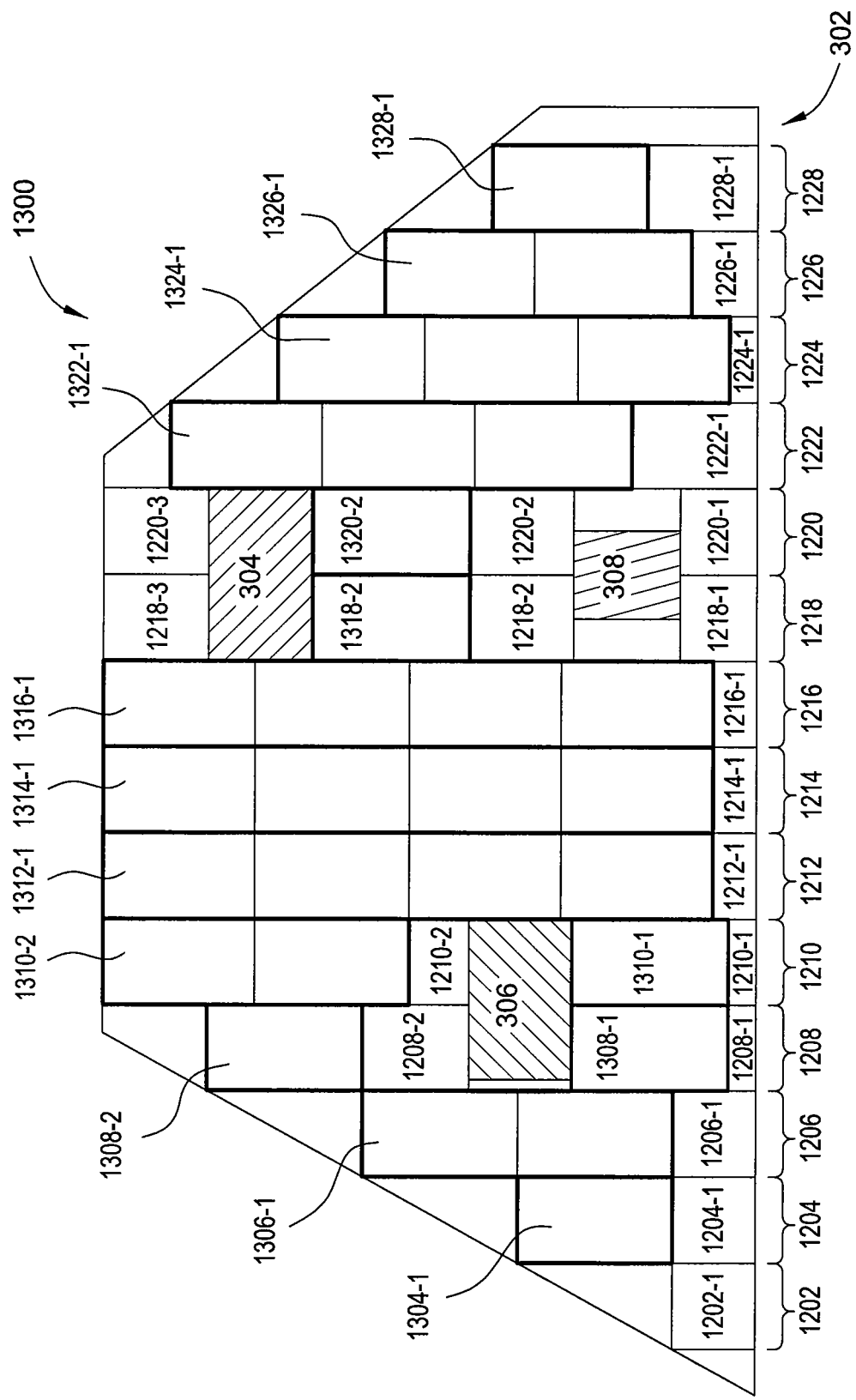

FIG. 13 is a conceptual diagram 1300 that illustrates target surface 302 and a collection of linear sets projected onto target surface 302. Each linear set resides within a different span also projected onto target surface 302. As shown, span 1204-1 includes linear set 1304-1, span 1206-1 includes linear set 1306-1, span 1208-1 includes linear set 1308-1, span 1208-2 includes linear set 1308-2, span 1210-1 includes linear set 1310-1, span 1210-2 includes linear set 1310-2, span 1212-1 includes linear set 1312-1, span 1214-1 includes linear set 1314-1, span 1216-1 includes linear set 1316-1, span 1218-2 includes linear set 1318-2, span 1220-2 includes linear set 1320-2, span 1222-1 includes linear set 1322-1, span 1224-1 includes linear set 1324-1, span 1226-1 includes linear set 1326-1, and span 1228-1 includes linear set 1328-1. Each of spans 1202-1, 1218-1, 1218-3, 1220-1, and 1220-3 do not include a linear set because those spans lack sufficient area for any solar modules.

Optimization engine 100 is configured to populate each span with vertically-stacked solar modules disposed according to a portrait orientation in order to generate the linear sets shown in FIG. 13. Optimization engine 100 may align each linear set with the top side of the corresponding span or the bottom side of the corresponding span, among other initial alignments. In the exemplary embodiment shown in FIG. 13, each linear set is aligned to the top side of the corresponding span. Optimization engine 100 is configured to re-align each linear set to an adjacent linear set, in like fashion as described in conjunction with FIGS. 7 and 10 and as described in greater detail below in conjunction with FIG. 14.

Figure 14:
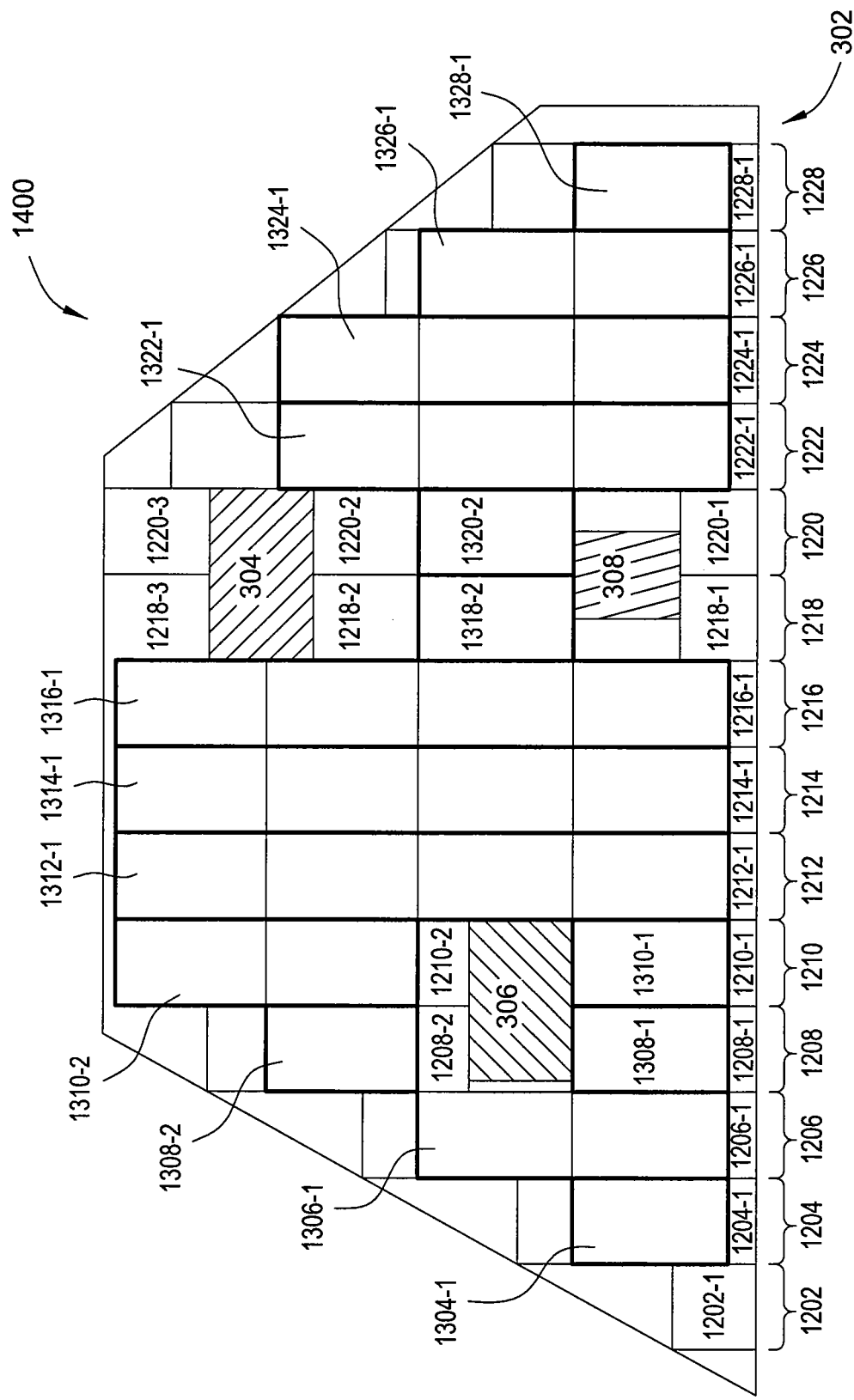

FIG. 14 is a conceptual diagram 1400 that illustrates target surface 302 and the collection of linear sets projected onto target surface 302 described above in conjunction with FIG. 13. As shown, some of the linear sets shown have been re-aligned, i.e. the solar modules within certain linear sets have been shifted vertically to have a horizontal side collinear with a horizontal side of a solar module within a horizontally-adjacent linear set. Optimization engine 100 is configured to re-align some or all of the linear sets projected onto target surface 302 relative to a horizontally-adjacent linear set starting with a specified alignment set, in similar fashion as described above in conjunction with FIGS. 7 and 10. Optimization engine 100 identifies a single solar module array that includes all of the linear sets shown in FIG. 14, then selects the linear set having the most solar modules as the alignment set. Since linear sets 1312-1, 1314-1, and 1316-1 have equal numbers of solar modules, and that number is a maximum compared to the other linear sets shown in FIG. 14, optimization engine 100 may select any of linear sets 1312-1, 1314-1, and 1316-1 as the alignment set. In the exemplary embodiment described herein, optimization engine 100 selects linear set 1312-1 as the alignment set.

Optimization engine 100 then identifies one or more sequences of linear sets on which to perform an alignment process, starting with the alignment set and traversing the target surface 302. In the exemplary embodiment shown in FIG. 13, optimization engine 100 identifies a first sequence that includes linear sets 1310-2 and 1308-2, a second sequence that includes linear sets 1310-1, 1308-1, 1306-1, and 1304-1, and a third sequence that includes linear sets 1314-1, 1316-1, 1318-2, 1320-2, 1322-1, 1324-1 1326-1, and 1328-1.

For each sequence of linear sets, optimization engine 100 then performs a sequential alignment process similar to that described above in conjunction with FIGS. 7 and 10 by aligning the solar modules residing within each linear set with the solar modules residing in adjacent linear sets, starting with the alignment set, traversing target surface 302, and repeatedly designating a new reference set to which subsequent linear sets are aligned. In practice, optimization engine 100 may perform the alignment process column by column, i.e. by aligning the linear sets in each column relative to the alignment set or relative to a current reference set.

Figure 15:
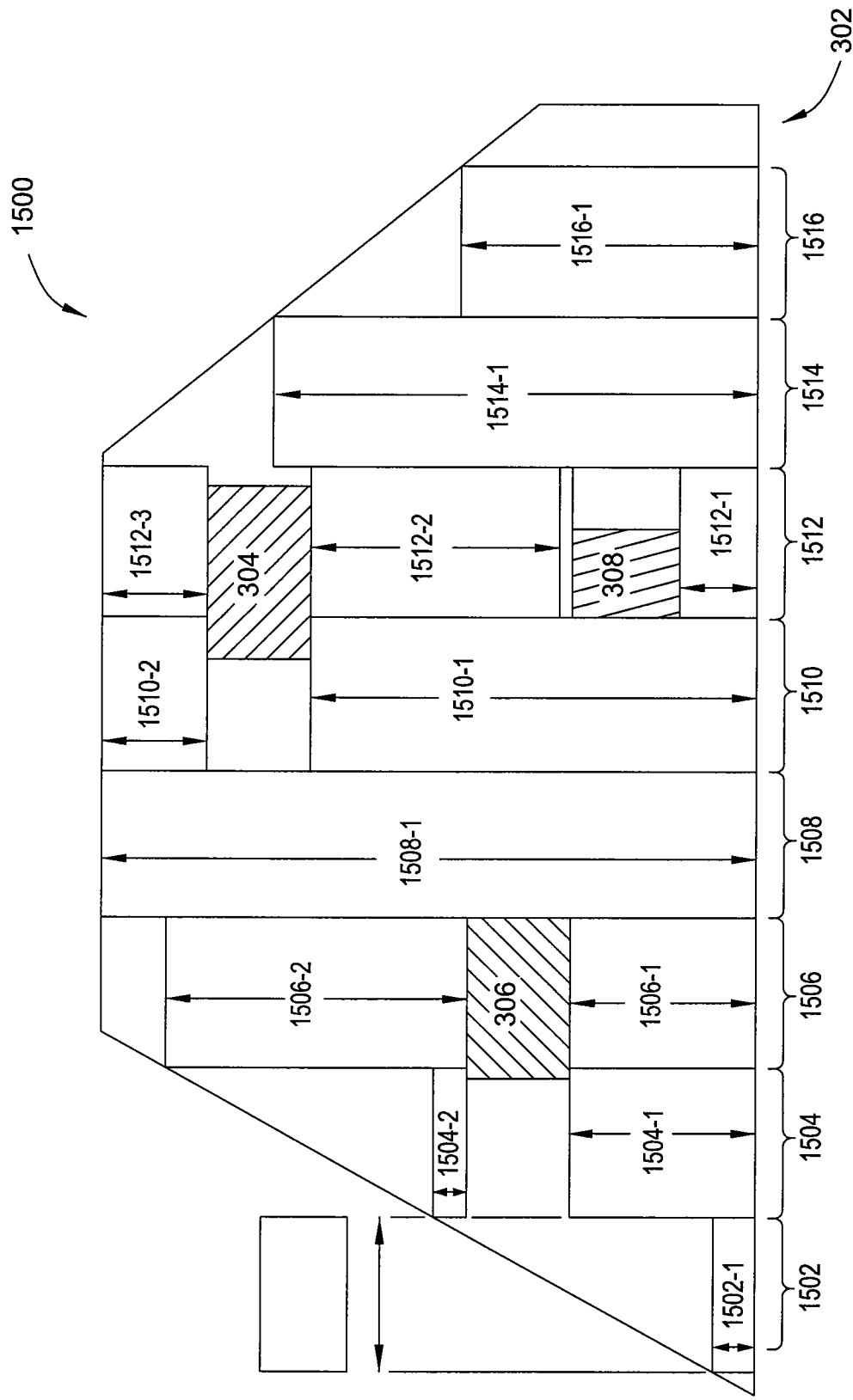

FIG. 15 is a conceptual diagram 1500 that illustrates target surface 302 as well as columns 1502, 1504, 1506, 1508, 1510, 1512, 1514, and 1516. Column 1502 includes span 1502-1, column 1504 includes spans 1504-1 and 1504-

2, column 1506 includes spans 1506-1 and 1506-2, column 1508 includes span 1508-1, column 1510 includes spans 1510-1 and 1510-2, column 1512 includes spans 1512-1, 1512-2, and 1512-3, column 1514 includes span 1514-1, and column 1516 includes span 1516-1. Each column and the corresponding span(s) has a width equal to the width of a given solar module type disposed according to a landscape orientation. Optimization engine 100 is configured to identify each column shown in FIG. 15 and one or more corresponding spans relative to one of the alignment axes shown in FIG. 11. For exemplary purposes, FIG. 15 illustrates rows and corresponding spans generated by optimization engine 100 relative to alignment axis 1102 (shown in FIG. 11). Optimization engine 100 generates the spans shown in FIG. 15 according to a similar technique as that described in conjunction with FIG. 12.

Figure 16:
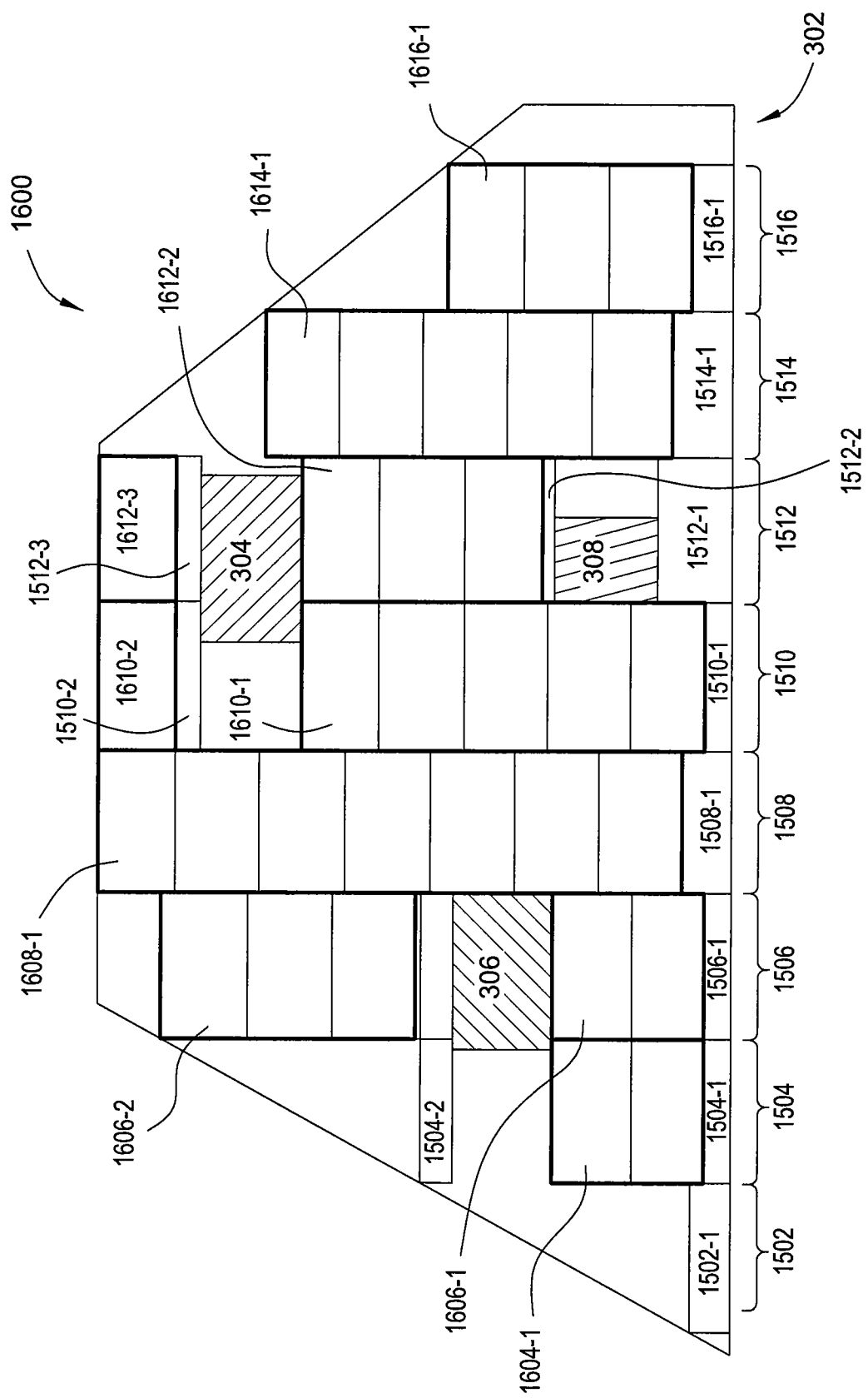

FIG. 16 is a conceptual diagram 1600 that illustrates target surface 302 and a collection of linear sets projected onto target surface 302. Each linear set resides within a different span also projected onto target surface 302. As shown, span 1504-1 includes linear set 1604-1, span 1506-1 includes linear set 1606-1, span 1506-2 includes linear set 1606-2, span 1508-1 includes linear set 1608-1, span 1510-1 includes linear set 1610-1, span 1510-2 includes linear set 1610-2, span 1512-2 includes linear set 1612-2, span 1512-3 includes linear set 1612-3, span 1514-1 includes linear set 1614-1, and span 1516-1 includes linear set 1616-1. Each of spans 1502-1, 1504-2, and 1512-1 do not include a linear set because those spans lack sufficient area for any solar modules.

Optimization engine 100 is configured to populate each span with vertically-stacked solar modules disposed according to a landscape orientation in order to generate the linear sets shown in FIG. 16, in like fashion as described above in conjunction with FIG. 13. Optimization engine 100 may align each linear set with the top side of the corresponding span or the bottom side of the corresponding span, among other initial alignments. In the exemplary embodiment shown in FIG. 16, each linear set is aligned to the top side of the corresponding span. Optimization engine 100 is configured to re-align each linear set to an adjacent linear set in similar fashion as described above in conjunction with FIG. 14 and as described in greater detail below in conjunction with FIG. 17.

Figure 17:
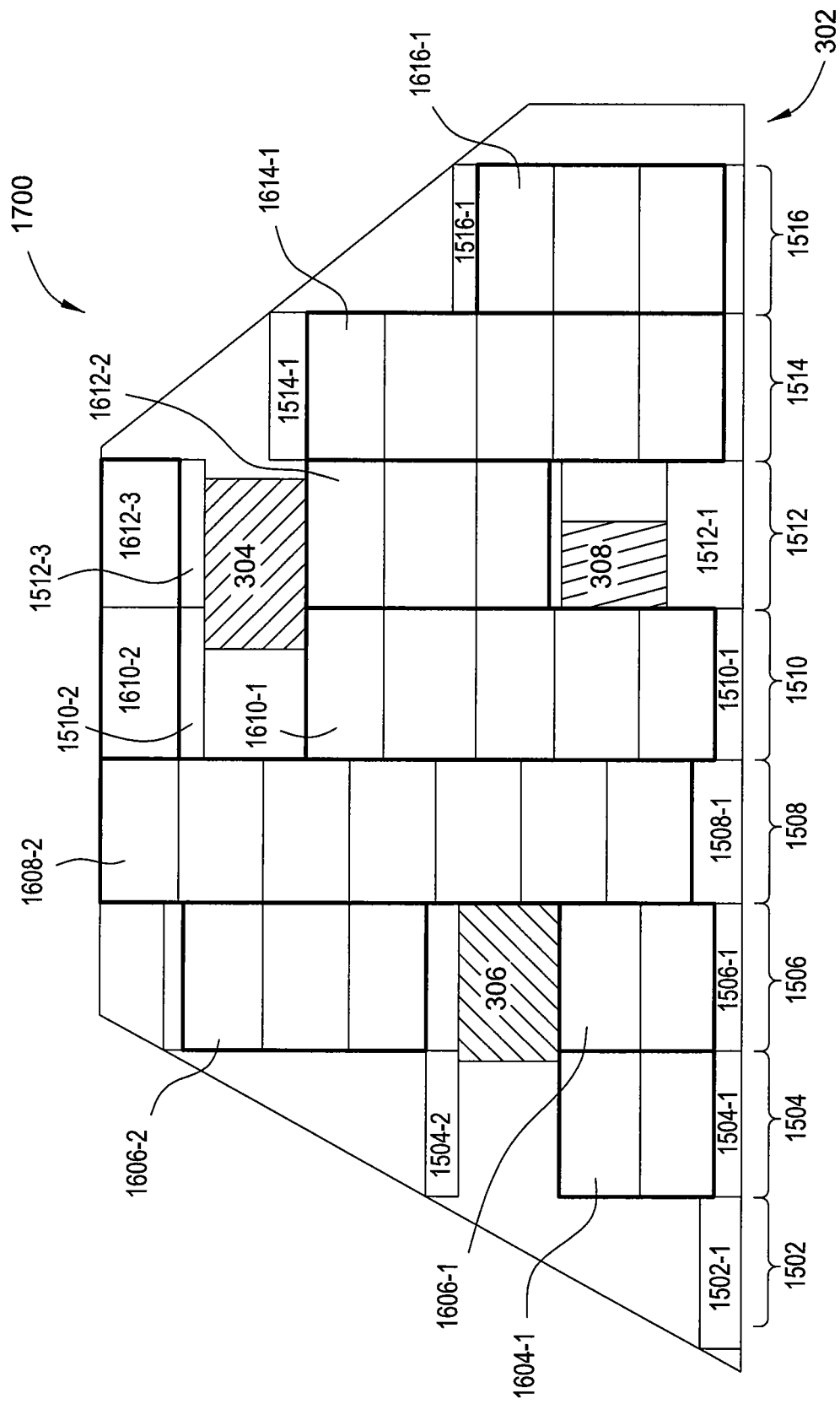

FIG. 17 is a conceptual diagram 1700 that illustrates target surface 302 and the collection of linear sets projected onto target surface 302 described above in conjunction with FIG. 16. As shown, some of the linear sets shown have been re-aligned. Optimization engine 100 is configured to re-align some or all of the linear sets projected onto target surface 302 relative to an alignment set, in similar fashion as described above in conjunction with FIGS. 7, 10, and 14. Optimization engine 100 selects linear set 1608-1 as the alignment set and then identifies one or more sequences of linear sets on which to perform an alignment process, starting with the alignment set, traversing the target surface 302, and repeatedly designating a new reference set.

In practice, optimization engine 100 may perform the alignment process column by column, i.e. by aligning the linear sets in each column relative to the alignment set or relative to a current reference set. By performing the sequential alignment process described above, optimization engine 100 may align the solar modules residing within each linear set with the solar modules residing in adjacent linear sets.

Although the above description makes reference to the exemplary embodiments shown in FIGS. 4-17, those skilled in the art will understand that those embodiments merely illustrate various examples of optimization engine 100 performing first and second steps in the iterative procedure that each involves horizontally-oriented linear sets and third and fourth steps in the iterative procedure that each involves vertically-oriented linear sets. In practice, optimization engine 100 may perform the techniques described above with any target surface and any type of solar module, and may also mix and match solar modules disposed according to portrait and landscape orientations within a single solar power system configuration.

Once optimization engine 100 has generated a set of solar power system configurations by performing the different iterations described above, optimization engine 100 may generate a performance estimate for each such solar power system configuration. In one embodiment, optimization engine 100 implements Sandia National Laboratories' Photovoltaic Performance Model and estimates the performance of each solar module based on one or more of: (i) the location and/or orientation of target surface 302, (ii) the solar module type used, (iii) a utility rate corresponding to the location of target surface 302, (iv) an amount of irradiance net of shading associated with each solar module, (v) long-term average or typical weather data as well as measured weather data of arbitrary duration and frequency as well as (vi) power flow simulators that account for module electrical wiring and topology. In other embodiments, National Renewable Energy Lab's PVWatts or the University of Wisconsin 5, 6 or 7 Parameter models can be used in place of the Sandia National Laboratories' PV Performance Model.

Optimization engine 100 may also perform each step of the iterative procedure using a variety of different parameters, including different solar module types, different alignment axes, different alignment sets, and so forth. In doing so, optimization engine 100 is configured to optimize the performance estimate for the solar power system configuration produced by performing each step. Optimization engine 100 may then select the solar power system configuration having the optimal performance estimate relative to other possible solar power system configurations.

Figure 18:
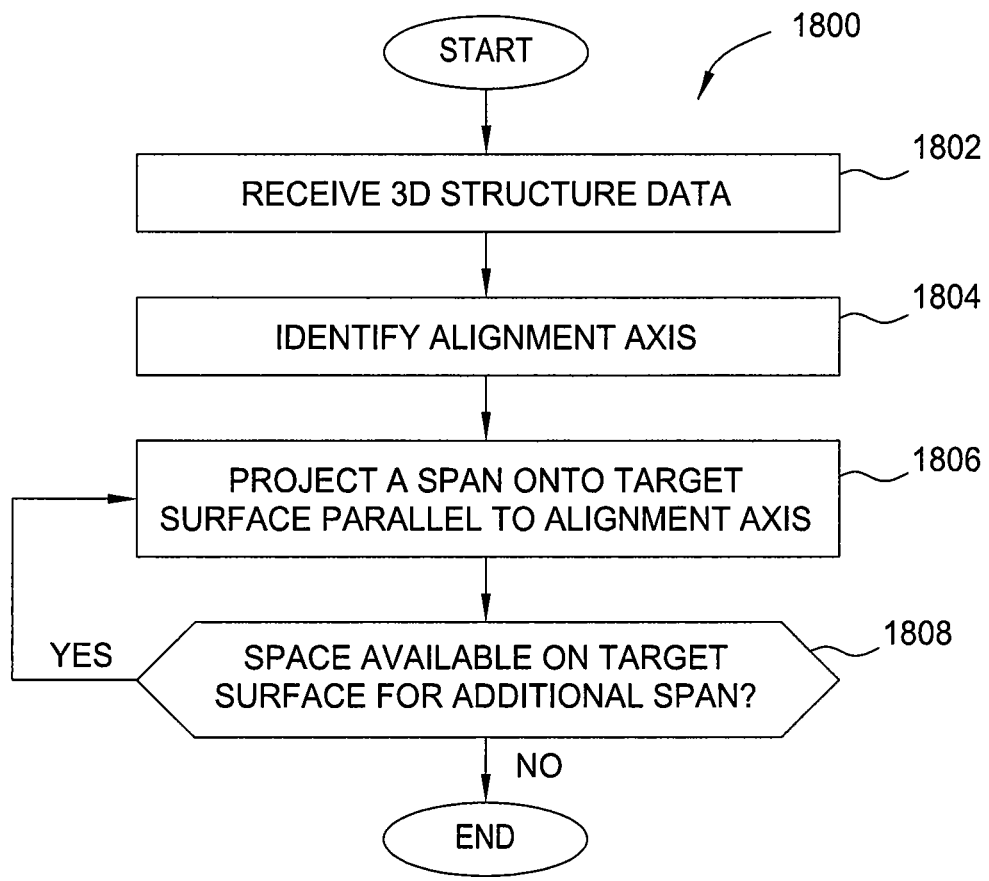
FIG. 18 is a flowchart of method steps for projecting one or more spans onto a target surface, according to one embodiment of the present invention.

FIG. 18 is a flowchart of method steps for projecting one or more spans onto a target surface, according to one embodiment of the present invention. Persons skilled in the art will understand that, although the method 1800 is described in conjunction with the system of FIG. 1, any system configured to perform the method steps, in any order, is within the scope of the present invention. Optimization engine 100 may perform the method 1800 when implementing the techniques described above in conjunction with FIGS. 4-5, 8, 11-12, and 15.

As shown, the method 1800 begins at step 1802, where optimization engine 100 receives data that represents a 3D structure. Optimization engine 100 may extract that data from a geospatial data set residing in database 116 or CAD interface 114. The data representing the 3D structure indicates a target surface, such as, e.g., target surface 302 shown in FIG. 3. The target surface may be suitable for a solar power system installation.

At step 1804, optimization engine 100 identifies an alignment axis associated with the target surface. The alignment axis could be, e.g. alignment axis 402 shown in FIG. 4 or 1102 shown in FIG. 11, among other alignment axes shown in those figures. The alignment axis passes through an alignment point, which corresponds to a vertex of an obstruction disposed on the target surface or a vertex of the boundary of the target surface itself.

At step 1806, optimization engine 100 projects a span onto the target surface parallel to the alignment axis. The span represents an available area onto which solar modules may be projected. At step 1808, optimization engine 100 determines whether space is available on the target surface for an additional span. At step 1808, if optimization engine 100 determines that no space is available, then the method 1800 ends. Otherwise, if optimization engine 100 determines that space is available for an additional span, then the method 1800 returns to step 1806.

By implementing the method 1800, optimization engine 100 projects spans onto the target surface. Optimization engine 100 may then populate those spans with solar modules to create linear sets, as described on greater detail below in conjunction with FIG. 19.

Figure 19:
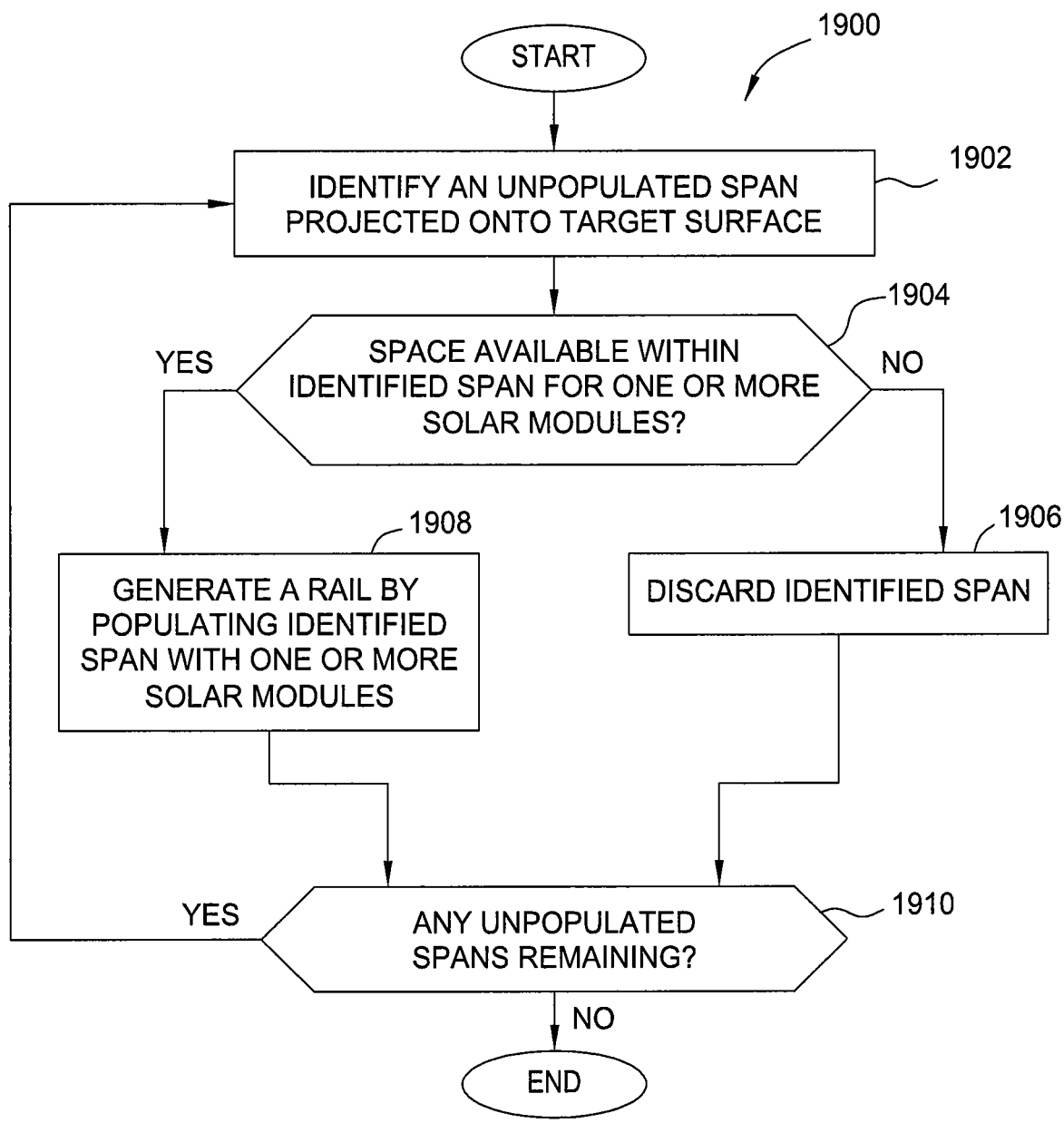
FIG. 19 is a flowchart of method steps for populating spans disposed on a target surface with solar modules to generate linear sets, according to one embodiment of the present invention.

FIG. 19 is a flowchart of method steps for populating spans disposed on a target surface with solar modules to generate linear sets, according to one embodiment of the present invention. Persons skilled in the art will understand that, although the method 1900 is described in conjunction with the system of FIG. 1, any system configured to perform the method steps, in any order, is within the scope of the present invention. Optimization engine 100 may perform the method 1900 when implementing the techniques described above in conjunction with FIGS. 6, 9, 13, and 16.

As shown, the method 1900 begins at step 1902, where optimization engine 100 identifies an unpopulated span projected onto the target surface. The unpopulated span could be generated, e.g., when optimization engine 100 implements the method 1800 described above in conjunction with FIG. 18. At step 1904, optimization engine 100 determines whether space is available within the identified span for one or more solar modules.

At step 1904, if optimization engine 100 determines that no space is available within the identified span, then the method 1900 proceeds to step 1906, where optimization engine 100 discards the identified span. The method then proceeds to step 1910.

At step 1904, if optimization engine 100 determines that space is available within the identified span, then the method 1900 proceeds to step 1908, where optimization engine 100 generates a linear set by populating the identified span with one or more solar modules. When performing the first and second steps of the iterative procedure, described above in conjunction with FIGS. 5-7 and 8-10, respectively, optimization engine 100 populates the span by stacking solar modules horizontally within the linear set. When performing the third and fourth steps of the iterative procedure, described above in conjunction with FIGS. 12-14 and 15-17, respectively, optimization engine 100 populates the span by stacking solar modules vertically within the linear set. The method then proceeds to step 1910.

At step 1910, optimization engine 100 determines whether any unpopulated spans remain. If optimization engine 100 determines that no unpopulated spans remain, then the method 1900 ends. Otherwise, if optimization engine 100 determines that unpopulated spans remain, then the method 1900 returns to step 1902.

By implementing the method 1900, optimization engine 100 may generate linear sets by populating each span with solar modules. Optimization engine 100 may then align the solar modules within each linear set, as described in greater detail below in conjunction with FIG. 20.

Figure 20:
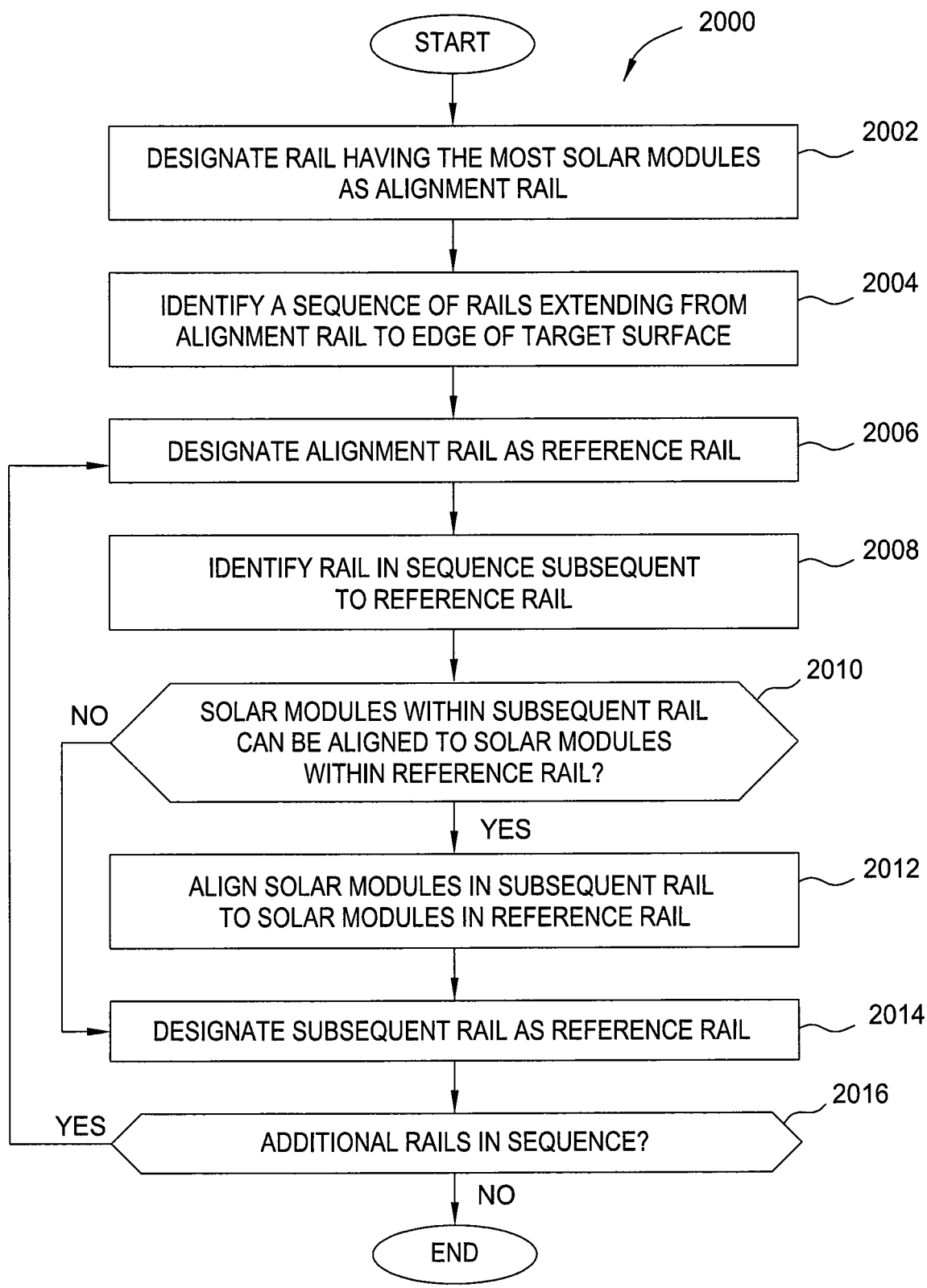
FIG. 20 is a flowchart of method steps aligning solar modules within adjacent linear sets, according to one embodiment of the present invention.

FIG. 20 is a flowchart of method steps aligning solar modules within adjacent linear sets, according to one embodiment of the present invention. Persons skilled in the art will understand that, although the method 2000 is described in conjunction with the system of FIG. 1, any system configured to perform the method steps, in any order, is within the scope of the present invention. Optimization engine 100 may perform the method 2000 when implementing the techniques described above in conjunction with FIGS. 7, 10, 14, and 17.

As shown, the method 2000 begins at step 2002, where optimization engine 100 designates the linear set having the most solar modules as the alignment set. At step 2004, optimization engine 100 identifies a sequence of linear sets extending from the alignment set to the edge of the target surface. In practice, optimization engine 100 may identify more than one sequence of linear sets, as described above in conjunction with FIGS. 7, 10, 14, and 17. However, for the sake of simplicity, the method 2000 is directed towards identifying one sequence.

At step 2006, optimization engine 100 designates the alignment set as the reference set. At step 2008, optimization engine 100 identifies a linear set in the sequence subsequent to the reference set. The subsequent linear set resides adjacent to the reference set. At step 2010, optimization engine 100 determines whether the subsequent linear set can be aligned to the reference set, i.e. whether the solar modules within the subsequent linear set can be aligned with the solar modules within the reference set.

At step 2010, if optimization engine 100 determines that the solar modules in the subsequent linear set cannot be aligned to the reference set, then the method 2000 proceeds to step 2014. Otherwise, if optimization engine 100 determines at step 2010 that the solar modules in the subsequent linear set can be aligned to the reference set, then the method 2000 proceeds to step 2012, where optimization engine 100 aligns the subsequent linear set to the reference set. The method 2000 then proceeds to step 2014.

At step 2014, optimization engine 100 designates the subsequent linear set as the reference set. At step 2016, optimization engine 100 determines whether the sequence of linear sets includes additional linear sets. If optimization engine 100 determines that no additional linear sets remain, then the method ends. Otherwise, if optimization engine 100 determines that additional linear sets remain, then the method 2000 returns to step 2006.

By implementing the method 2000, optimization engine 100 traverses the target surface, aligning the solar modules within each linear set relative to the solar modules within an adjacent linear set. In doing so, optimization engine 100 may generate a solar power system configuration comprised of aligned solar modules. Optimization engine 100 may then generate a performance estimates for that solar power system, as described in greater detail below in conjunction with FIG. 21.

Figure 21:
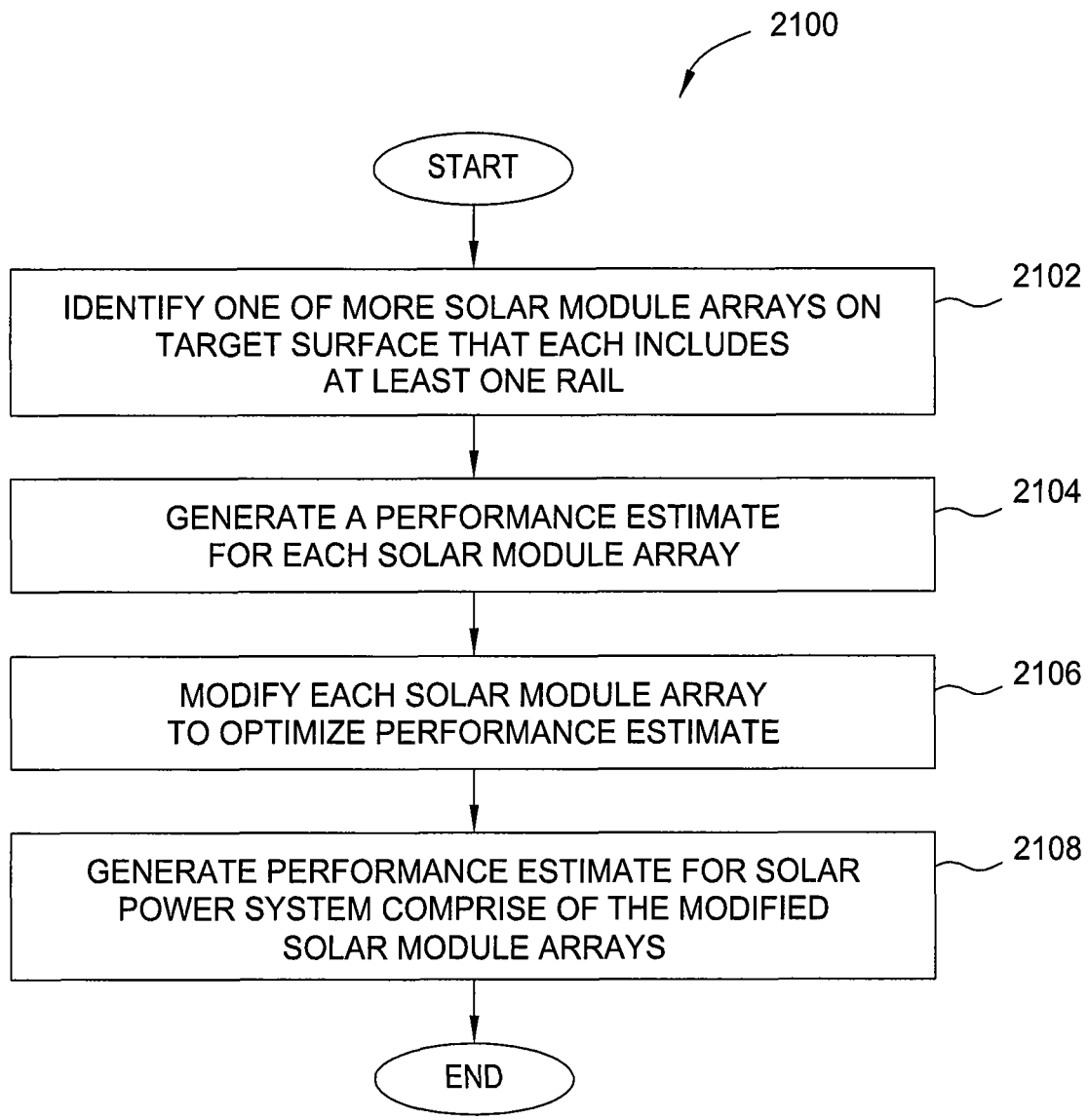
FIG. 21 is a flowchart of method steps for generating a performance estimate for a solar power system, according to one embodiment of the present invention.

FIG. 21 is a flowchart of method steps for generating a performance estimate for a solar power system, according to one embodiment of the present invention. Persons skilled in the art will understand that, although the method 2100 is described in conjunction with the system of FIG. 1, any system configured to perform the method steps, in any order, is within the scope of the present invention.

As shown, the method begins at step 2102, where optimization engine 100 identifies one or more solar module arrays projected onto the target surface that each includes at least one linear set. A solar module array includes a set of contiguous solar modules. At step 2104, optimization engine 100 generates a performance estimate for each solar module array. The performance estimate could be based on, e.g., Sandia National Laboratories' Photovoltaic Performance Model, among other performance models.

At step 2106, optimization engine 100 modifies the solar module arrays to optimize the corresponding performance estimates. In doing so, optimization engine 100 may trim certain solar modules from the solar module arrays, change the orientation of specific solar modules, or shift the solar module array as a whole, among other modifications. At step 2108, optimization engine 100 generates a performance estimate for the solar power system based on the performance estimates generated for the different solar module arrays within the solar power system.

Optimization engine 100 may perform the methods 1800, 1900, 2000, and 2100 when performing the various steps of the iterative procedure discussed above in conjunction with FIGS. 4-17. In this fashion, optimization engine 100 is configured to generate four separate types of solar power system configurations corresponding to the four different steps. Optimization engine 100 may then select the solar power system configuration having the optimal performance estimate relative to the other solar power system configurations.

Additionally, optimization engine 100 may implement the methods 1800, 1900, 2000, and 2100 repeatedly using various different parameters, such as solar module type, alignment points, alignment axes, alignment sets, performance models, or solar module construction requirements, among others. Optimization engine 100 is configured to repeat the methods described above in order to identify the optimized configuration of solar modules to be used in a solar power system installation In sum, an optimization engine determines an optimized configuration for a solar power system projected onto a target surface. The optimization engine identifies an alignment axis that passes through a vertex of a boundary associated with the target surface and then constructs horizontal or vertical spans that represent contiguous areas where solar modules may be placed. The optimization engine populates each span with solar modules and aligns the solar modules within adjacent spans to one another. The optimization engine then generates a performance estimate for arrays of populated spans. By generating different spans with different solar module types and orientations, the optimization engine is configured to identify multiple different solar power system configurations.

Advantageously, the optimization engine is capable of programmatically identifying an optimized configuration of solar modules for use within a solar power system to be installed on a given target surface, thereby greatly improving the potential performance of that solar power system. Furthermore, since the optimization engine is computer-implemented, the configuration process is significantly more expedient and less costly than traditional manually-performed techniques.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

The invention claimed is:

1. A non-transitory processor-readable medium storing instructions for configuring a solar power system that, when executed by a processing unit, performs the steps of:
    identifying a plurality of vertices from at least one physical obstruction preventing an installation of at least one solar module on the target surface, wherein each one of the plurality of identified vertices is one alignment point of a plurality of alignment points;
    identifying a plurality of alignment axes, wherein each one of the plurality of identified alignment axes passes through one of the plurality of alignment points;
    selecting one alignment axis from the plurality of identified alignment axes;
    projecting a plurality of spans onto the target surface, such that each one of the plurality of projected spans is without at least one physical obstruction and parallel to the selected alignment axis; and
    populating each one of the plurality of projected spans with a set of solar modules.

2. The non-transitory processor-readable medium of claim 1, wherein
    the plurality of vertices is further identified from a plurality of boundaries of the target surface, wherein each one of the plurality of vertices identified from the plurality of boundaries is one second alignment point of the plurality of alignment points; and
    the plurality of identified alignment axes includes a second plurality of identified alignment axes, wherein each one of the second plurality of identified alignment axes includes two ends coinciding with two of the plurality of second alignment points.

3. The non-transitory processor-readable medium of claim 1, wherein each solar module in the set of solar modules is populated in a portrait orientation or a landscape orientation.

4. The non-transitory processor-readable medium of claim 1, wherein the steps include:
    aligning a first set of solar modules populating a first span of the plurality of spans with a second set of solar modules populating a second span of the plurality of spans, wherein the first set of solar modules and the second set of solar modules are positioned relative to each other, such that at least one side of at least one solar module of the first set of solar modules and at least one side of at least one solar module of the second set of solar modules are collinear.

5. An electronic device for configuring a solar power system, comprising:
    a processing unit coupled memory and configured to:
        identify a plurality of vertices from at least one physical obstruction preventing an installation of at least one solar module on the target surface, wherein each one of the plurality of identified vertices is one alignment point of a plurality of alignment points;
        identify a plurality of alignment axes, wherein each one of the plurality of identified alignment axes passes through one of the plurality of alignment points;

select one alignment axis from the plurality of identified alignment axes;
project a plurality of spans onto the target surface, such that each one of the plurality of projected spans is without at least one physical obstruction and parallel to the selected alignment axis; and
populate each one of the plurality of projected spans with a set of solar modules.

6. The electronic device of claim 5, wherein
the plurality of vertices is further identified from a plurality of boundaries of the target surface, wherein each one of the plurality of vertices identified from the plurality of boundaries is one second alignment point of the plurality of alignment points; and
the plurality of identified alignment axes includes a second plurality of identified alignment axes, wherein each one of the second plurality of identified alignment axes includes two ends coinciding with two of the plurality of second alignment points.

7. The electronic device of claim 5, wherein each solar module in the set of solar modules is populated in a portrait orientation or a landscape orientation.

8. The electronic device of claim 5, wherein
the processing unit is further configured to:
align a first set of solar modules populating a first span of the plurality of spans with a second set of solar modules populating a second span of the plurality of spans, wherein the first set of solar modules and the second set of solar modules are positioned relative to each other, such that at least one side of at least one solar module of the first set of solar modules and at least one side of at least one solar module of the second set of solar modules are collinear.

9. A non-transitory processor-readable medium storing instructions for configuring a solar power system that, when executed by a processing unit, performs the steps of:
identifying a plurality of vertices from at least one physical obstruction preventing an installation of at least one solar module on the target surface, wherein each one of the plurality of identified vertices is one alignment point of a plurality of alignment points;
identifying a plurality of alignment axes, wherein each one of the plurality of identified alignment axes passes through one of the plurality of alignment points;
selecting a plurality of alignment axes from the plurality of identified alignment axes;
projecting a plurality of first spans onto the target surface, such that each one of the plurality of first projected spans is without at least one physical obstruction and parallel to a first selected alignment axis of the plurality of selected alignment axes;
projecting a plurality of second spans onto the target surface, such that each one of the plurality of second projected spans is without at least one physical obstruction and parallel to a second selected alignment axis of the plurality of selected alignment axes;
populating each one of the plurality of first projected spans with a first set of solar modules; and
populating each one of the plurality of second projected spans with a second set of solar modules.

10. The non-transitory processor-readable medium of claim 9, wherein
the plurality of vertices is further identified from a plurality of boundaries of the target surface, wherein each one of the plurality of vertices identified from the plurality of boundaries is one second alignment point of the plurality of alignment points; and
the plurality of identified alignment axes includes a second plurality of identified alignment axes, wherein each one of the second plurality of identified alignment axes includes two ends coinciding with two of the plurality of second alignment points.

11. The non-transitory processor-readable medium of claim 9, wherein each solar module in the set of solar modules is populated in a portrait orientation or a landscape orientation.

12. An electronic device for configuring a solar power system, comprising:
a processing unit coupled memory and configured to:
identify a plurality of vertices from at least one physical obstruction preventing an installation of at least one solar module on the target surface, wherein each one of the plurality of identified vertices is one alignment point of a plurality of alignment points;
identify a plurality of alignment axes, wherein each one of the plurality of identified alignment axes passes through one of the plurality of alignment points;
select a plurality of alignment axes from the plurality of identified alignment axes;
project a plurality of first spans onto the target surface, such that each one of the plurality of first projected spans is without at least one physical obstruction and parallel to a first selected alignment axis of the plurality of selected alignment axes;
project a plurality of second spans onto the target surface, such that each one of the plurality of second projected spans is without at least one physical obstruction and parallel to a second selected alignment axis of the plurality of selected alignment axes;
populate each one of the plurality of first projected spans with a first set of solar modules; and
populate each one of the plurality of second projected spans with a second set of solar modules.

13. The electronic device of claim 12, wherein
the plurality of vertices is further identified from a plurality of boundaries of the target surface, wherein each one of the plurality of vertices identified from the plurality of boundaries is one second alignment point of the plurality of alignment points; and
the plurality of identified alignment axes includes a second plurality of identified alignment axes, wherein each one of the second plurality of identified alignment axes includes two ends coinciding with two of the plurality of second alignment points.

14. The non-transitory processor-readable medium of claim 12, wherein each solar module in the set of solar modules is populated in a portrait orientation or a landscape orientation.

15. A non-transitory processor-readable medium storing instructions for configuring a solar power system that, when executed by a processing unit, performs the steps of:
identifying a plurality of vertices from at least one physical obstruction preventing an installation of at least one solar module on the target surface, wherein each one of the plurality of identified vertices is one alignment point of a plurality of alignment points;
identifying a plurality of alignment axes, wherein each one of the plurality of identified alignment axes passes through one of the plurality of alignment points;
selecting one alignment axis from the plurality of identified alignment axes;
projecting a row or a column traversing the target surface and parallel to the selected alignment axis, identifying at least one obstruction in the projected row or the projected column;

identifying at least one span of the projected row or the projected column, wherein each identified span is a portion of the projected row or the projected column without a physical obstruction; and populating each identified span with a set of solar modules in a portrait orientation or a landscape orientation.

16. The non-transitory processor-readable medium of claim 15, wherein the plurality of vertices is further identified from a plurality of boundaries of the target surface, wherein each one of the plurality of vertices identified from the plurality of boundaries is one second alignment point of the plurality of alignment points; and the plurality of identified alignment axes includes a second plurality of identified alignment axes, wherein each one of the second plurality of identified alignment axes includes two ends coinciding with two of the plurality of second alignment points.

17. The non-transitory processor-readable medium of claim 16, wherein the steps include:

projecting, after each identified span is populated with a set of solar modules, at least one second row or at least one second column traversing the target surface and parallel to one of the plurality of identified axes;

identifying at least one second physical obstruction in the projected second row or the projected second column;

identifying at least one second span of the projected second row or the projected second column, wherein each identified second span is a portion of the projected second row or the projected second column without a second identified physical obstruction; and populating each identified second span with one second set of at least one second set of solar modules in a portrait orientation or a landscape orientation.

18. An electronic device for configuring a solar power system, comprising:

a processing unit coupled memory and configured to:

identify a plurality of vertices from at least one physical obstruction preventing an installation of at least one solar module on the target surface, wherein each one of the plurality of identified vertices is one alignment point of a plurality of alignment points;

identify a plurality of alignment axes, wherein each one of the plurality of identified alignment axes passes through one of the plurality of alignment points;

select one alignment axis from the plurality of identified alignment axes;

project a row or a column traversing the target surface and parallel to the selected alignment axis, identify at least one obstruction in the projected row or the projected column;

identify at least one span of the projected row or the projected column, wherein each identified span is a portion of the projected row or the projected column without a physical obstruction and parallel to the selected alignment axis; and populate each identified span with a set of solar modules in a portrait orientation or a landscape orientation.

19. The electronic device of claim 18, wherein the plurality of vertices is further identified from a plurality of boundaries of the target surface, wherein each one of the plurality of vertices identified from the plurality of boundaries is one second alignment point of the plurality of alignment points; and the plurality of identified alignment axes includes a second plurality of identified alignment axes, wherein each one of the second plurality of identified alignment axes includes two ends coinciding with two of the plurality of second alignment points.

20. The electronic device of claim 19, wherein processing unit is further configured to:

project, after each identified span is populated with a set of solar modules, at least one second row or at least one second column traversing the target surface and parallel to one of the plurality of identified axes;

identify at least one second physical obstruction in the projected second row or the projected second column;

identify at least one second span of the projected second row or the projected second column, wherein each identified second span is a portion of the projected second row or the projected second column without a second identified physical obstruction; and populate each identified second span with one second set of at least one second set of solar modules in a portrait orientation or a landscape orientation.

* * * * *